(12) United States Patent
Oikawa

(10) Patent No.: US 7,106,927 B2
(45) Date of Patent: *Sep. 12, 2006

(54) OPTICAL CROSS-CONNECT APPARATUS

(75) Inventor: Yoichi Oikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 131 days.

This patent is subject to a terminal disclaimer.

(21) Appl. No.: 10/781,636

(22) Filed: Feb. 20, 2004

(65) Prior Publication Data

US 2004/0165818 A1    Aug. 26, 2004

(30) Foreign Application Priority Data

Feb. 21, 2003    (JP)    ............................. 2003-043665

(51) Int. Cl.
*G02B 6/28*    (2006.01)

(52) U.S. Cl. .......................... 385/24; 385/15; 359/118

(58) Field of Classification Search ................. 385/15, 385/24; 359/118

See application file for complete search history.

(56) References Cited

U.S. PATENT DOCUMENTS 5,627,925 A * 5/1997 Alferness et al. ............. 385/17
2004/0165816 A1 * 8/2004 Oikawa et al. ............... 385/17

OTHER PUBLICATIONS

English Language Abstract Japanese Patent Publication No. 05-030557, dated Feb. 5, 1993.
English Language Abstract Japanese Patent Publication No. 10-066112, dated Mar. 6, 1998.
English Language Abstract Japanese Patent Publication No. 2000-134649, dated May 12, 2000.
English Language Abstract Japanese Patent Publication No. 2000-175228, dated Jun. 23, 2000.
English Language Abstract Japanese Patent Publication No. 2000-324522, dated Nov. 24, 2000.
English Language Abstract Japanese Patent Publication No. 2001-008244, dated Jan. 12, 2001.
English Language Abstract Japanese Patent Publication No. 2002-165238, dated Jun. 7, 2002.
English Language Abstract Japanese Patent Publication No. 2002-244951, dated Aug. 30, 2002.

* cited by examiner

*Primary Examiner*—Jennifer Doan
(74) *Attorney, Agent, or Firm*—Staas & Halsey LLP

(57) ABSTRACT

Optical cross-connect apparatus including first wavelength converters converting m different wavelengths $\lambda 1$ through $\lambda m$ contained in n WDM input optical signals into 2m wavelengths $\lambda 1$ through $\lambda 2m$; a first wavelength cross-connector performing cross-connection according to wavelengths, separating the optical signals wavelength-converted by the first wavelength converters into 2m wavelengths combining optical signals with the 2m separated wavelengths; second wavelength converters converting the 2m wavelengths contained in the optical signals cross-connected by the first wavelength cross-connector into 2m wavelengths; a second wavelength cross-connector performing cross-connection according to wavelengths separating the optical signals wavelength-converted by the second wavelength converters into 2m wavelengths and combining optical signals with the 2m separated wavelengths; and third wavelength converters converting the 2m wavelengths $\lambda 1$ through $\lambda 2m$ in the optical signals cross-connected by the second wavelength cross-connector into m wavelengths $\lambda 1$ through $\lambda m$ and sending the m wavelengths $\lambda 1$ through $\lambda m$.

5 Claims, 25 Drawing Sheets

| | NUMBER OF AWGS INCLUDED IN WAVELENGTH CROSS-CONNECTORS | | | | | NUMBER OF AWGS INCLUDED IN WAVELENGTH CONVERTERS | | | | |
|---|---|---|---|---|---|---|---|---|---|---|
| | $2m\lambda$ | $m\lambda$ | $(2m-1)\lambda$ | $n\lambda$ | $mn\lambda$ | $2m\lambda$ | $m\lambda$ | $(2m-1)\lambda$ | $n\lambda$ | $mn\lambda$ |
| $\lambda$-BASED XC APPARATUS 10 | $4n$ | | | | | $4n$ | | | | |
| $\lambda$-BASED XC APPARATUS 20 | $2n$ | $4n$ | | | | $2n$ | $2n$ | | | |
| $\lambda$-BASED XC APPARATUS 30 | | | $2n$ | $2(2m-1)$ | | | $6n$ | | $2(2m-1)$ | |
| $\lambda$-BASED XC APPARATUS 40 | | | | | $2n$ | | $2n$ | $(2m-1)$ | $2n$ | $2n$ |
| $\lambda$-BASED XC APPARATUS 50 | | $2n$ | | | | | $4n$ | | | |

| | NUMBER OF WAVELENGTH CONVERTERS | | | | | | | |
|---|---|---|---|---|---|---|---|---|
| | m | m ↔ 2m | 2m | 2m ↔ 2m−1 | 2m | 2m ↔ n | n | mn ↔ mn |
| λ-BASED XC APPARATUS 10 | | 2n | | | | | | |
| λ-BASED XC APPARATUS 20 | 2n | 2n | | | | | | |
| λ-BASED XC APPARATUS 30 | | | | 2n | | | 2m−1 | |
| λ-BASED XC APPARATUS 40 | | | | | n | | | 2n |
| λ-BASED XC APPARATUS 50 | 2n | | | | | | | |

T2

OPTICAL CROSS-CONNECT APPARATUS

BACKGROUND OF THE INVENTION (1) Field of the Invention

This invention relates to an optical cross-connect apparatus and, more particularly, to an optical crossconnect apparatus for performing optical cross-connection of wavelength division multiplex (WDM) signals.

(2) Description of the Related Art

Optical communication networks form the core of telecommunication networks and are expected to provide more advanced services in a wider area. In particular, WDM, which is central to optical transmission systems, has been rapidly developed. WDM multiplexes a plurality of optical signals with different wavelengths into a single optical fiber.

On the other hand, to build immense photonic networks, WDM systems are connected to one another to form ring networks where each node is connected in a loop, mesh networks where nodes are connected in a mesh topology, and the like. One of key technologies for building such networks is optical cross-connect (OXC) apparatus.

OXC apparatus are installed in nodes on networks for performing switching to output an optical signal inputted to an input port to a target output port or for adding or dropping an optical signal. Usually large-scale spatial optical matrix switches including microelectro-mechanical systems (MEMSes) are used in the switching sections of OXC apparatus. Development of OXC apparatus which can switch about 1,000 channels is proceeding.

With conventional oxc apparatus, wavelength conversion is performed by a wavelength converter (transponder). In this case, a WDM optical signal transmitted is separated by an optical demultiplexer. Then obtained optical signals are converted to electrical signals and are converted to optical signals again. That is to say, optical-electrical-optical (OEO) conversion is performed. These optical signals are inputted to an optical matrix switch and are switched. Then the optical signals are wavelength-converted again by a transponder, are combined by an optical multiplexer, and are transmitted to the next stage as a WDM signal (see, for example, Japanese Unexamined Patent Publication No. 2000-134649, paragraph nos. [0020]–[0037] and FIG. 1).

With the conventional OXC apparatus, however, optical cross-connection is realized by an optical matrix switch made up of switch cells in which micro electromechanical parts, such as MEMSes, are used, so the maximum number of channels handled is about 1,000 due to difficulty in fabricating highly integrated optical switching elements, the complexity of control, etc. A 1000×1000 switching scale has a throughput of 10 Tbits/s at most.

Accordingly, the conventional OXC apparatus cannot perform the switching of more than 1,000 channels, so the development of next-generation multimedia networks cannot be expected.

SUMMARY OF THE INVENTION

The present invention was made under the background circumstances described above. An object of the present invention is to provide an optical cross-connect apparatus which provides high throughput by performing large-scale switching.

In order to achieve the above object, an optical cross-connect apparatus for performing non-blocking optical cross-connection of n WDM input optical signals each containing m different wavelengths $\lambda 1$–$\lambda m$ is provided. This optical cross-connect apparatus comprises n first wavelength converters for converting the m different wavelengths $\lambda 1$ through $\lambda m$ contained in the WDM input optical signals into 2m wavelengths $\lambda 1$ through $\lambda 2m$; a first wavelength cross-connector for performing cross-connection according to wavelengths, including n first demultiplexers for separating the optical signals wavelength-converted by the first wavelength converters into 2m wavelengths and n first multiplexers for combining optical signals with the 2m separated wavelengths, wherein same wavelengths should not be sent via each of bundles of 2m/n lines by which the first demultiplexers and the first multiplexers are connected; n second wavelength converters for converting the 2m wavelengths contained in the optical signals cross-connected by the first wavelength cross-connector into 2m wavelengths; a second wavelength cross-connector for performing cross-connection according to wavelengths, including n second demultiplexers for separating the optical signals wavelength-converted by the second wavelength converters into 2m wavelengths and n second multiplexers for combining optical signals with the 2m separated wavelengths, wherein same wavelengths should not be sent via each of bundles of 2m/n lines by which the second demultiplexers and the second multiplexers are connected; and n third wavelength converters for converting the 2m wavelengths $\lambda 1$ through $\lambda 2m$ contained in the optical signals cross-connected by the second wavelength cross-connector into m wavelengths $\lambda 1$ through $\lambda m$ and for sending the m wavelengths $\lambda 1$ through $\lambda m$.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 24 shows the scale of the abased XC apparatus.

FIG. 25 shows the scale of the abased XC apparatus.

DESCRIPTION OF THE PREFERRED EMBODIMENTS

Figure 1:
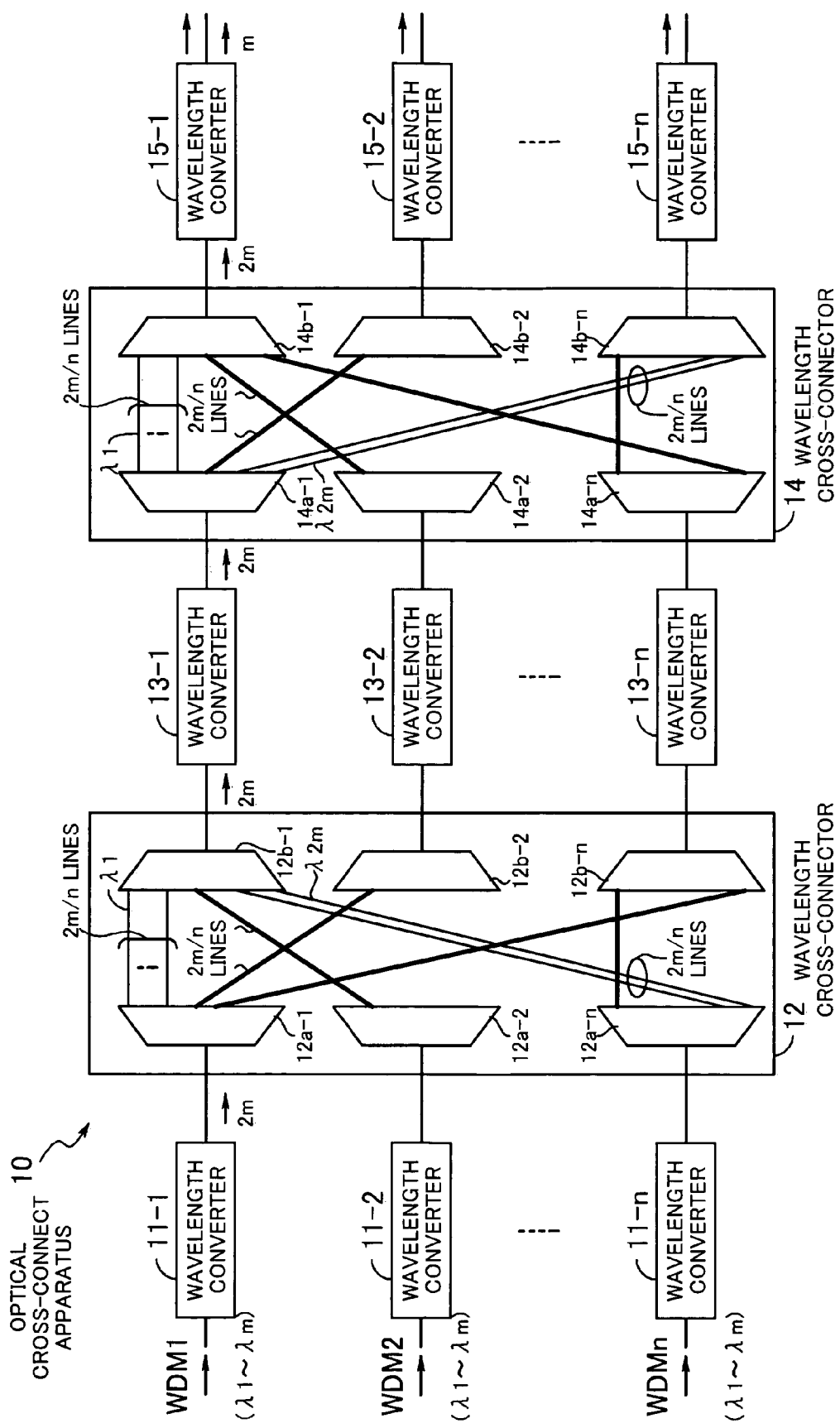
FIG. 1 is a view for describing the principles underlying an optical cross-connect apparatus according to the present invention.

Embodiments of the present invention will now be described with reference to the drawings. FIG. 1 is a view for describing the principles underlying an optical crossconnect apparatus according to the present invention. An optical cross-connect apparatus 10 performs non-blocking (a non-blocking type switch will be described later) optical cross-connection of n WDM input optical signals (the number of WDM routes is n) each containing different wavelengths λ1–λm (the number of the different wavelengths is m). The optical cross-connect apparatus 10 shown in FIG. 1 is a first embodiment of the present invention.

The optical cross-connect apparatus 10 comprises first wavelength converters 11-1 through 11-n (hereinafter referred to as the wavelength converters 11-1 through 11-n), a first wavelength cross-connector 12 (hereinafter referred to as the wavelength cross-connector 12), second wavelength converters 13-1 through 13-n (hereinafter referred to as the wavelength converters 13-1 through 13-n), a second wavelength cross-connector 14 (hereinafter referred to as the wavelength cross-connector 14), and third wavelength converters 15-1 through 15-n (hereinafter referred to as the wavelength converters 15-1 through 15-n). When mention is made of each component in the following description, the hyphen and the next number will be omitted (for example, the wavelength converters 11-1 through 11-n will be expressed as the wavelength converter 11).

The n wavelength converters 11-1 through 11-n convert m different wavelengths λ1 through λm contained in input WDM signals into 2m wavelengths λ1 through λ2m.

The wavelength cross-connector 12 includes first demultiplexers 12a-1 through 12a-n (hereinafter referred to as the demultiplexers 12a-1 through 12a-n), being passive optical devices, and first multiplexers 12b-1 through 12b-n (hereinafter referred to as the multiplexers 12b-1 through 12b-n), being passive optical devices, and performs cross-connection according to wavelengths. It is assumed that arrayed waveguide gratings (AWGs) are used as the demultiplexers and multiplexers in the present invention.

The n demultiplexers 12a-1 through 12a-n separate the optical signals wavelength-converted by the wavelength converters 11-1 through 11-n into 2m different wavelengths. The n multiplexers 12b-1 through 12b-n combine optical signals with the 2m different separated wavelengths. The same wavelengths should not be sent via each of bundles of 2m/n lines by which the demultiplexers 12a-1 through 12a-n and the multiplexers 12b-1 through 12b-n are connected (each thick solid line in FIG. 1 indicates a bundle of 2m/n lines).

The n wavelength converters 13-1 through 13-n convert the 2m different wavelengths contained in the optical signals cross-connected by the wavelength cross-connector 12 into 2m wavelengths.

The wavelength cross-connector 14 includes second demultiplexers 14a-1 through 14a-n (hereinafter referred to as the demultiplexers 14a-1 through 14a-n) and second multiplexers 14b-1 through 14b-n (hereinafter referred to as the multiplexers 14b-1 through 14b-n) and performs cross-connections according to wavelengths.

The n demultiplexers 14a-1 through 14a-n separate the optical signals wavelength-converted by the wavelength converters 13-1 through 13-n into the 2m different wavelengths. The n multiplexers 14b-1 through 14b-n combine optical signals with the 2m different separated wavelengths. The same wavelengths should not be sent via each of bundles of 2m/n lines by which the demultiplexers 14a-1 through 14a-n and the multiplexers 14b-1 through 14b-n are connected.

The wavelength converters 15-1 through 15-n convert the 2m wavelengths λ1 through λ2m contained in the optical signals cross-connected by the wavelength cross-connector 14 into m wavelengths λ1 through λm and send them as WDM signals.

Figure 2:
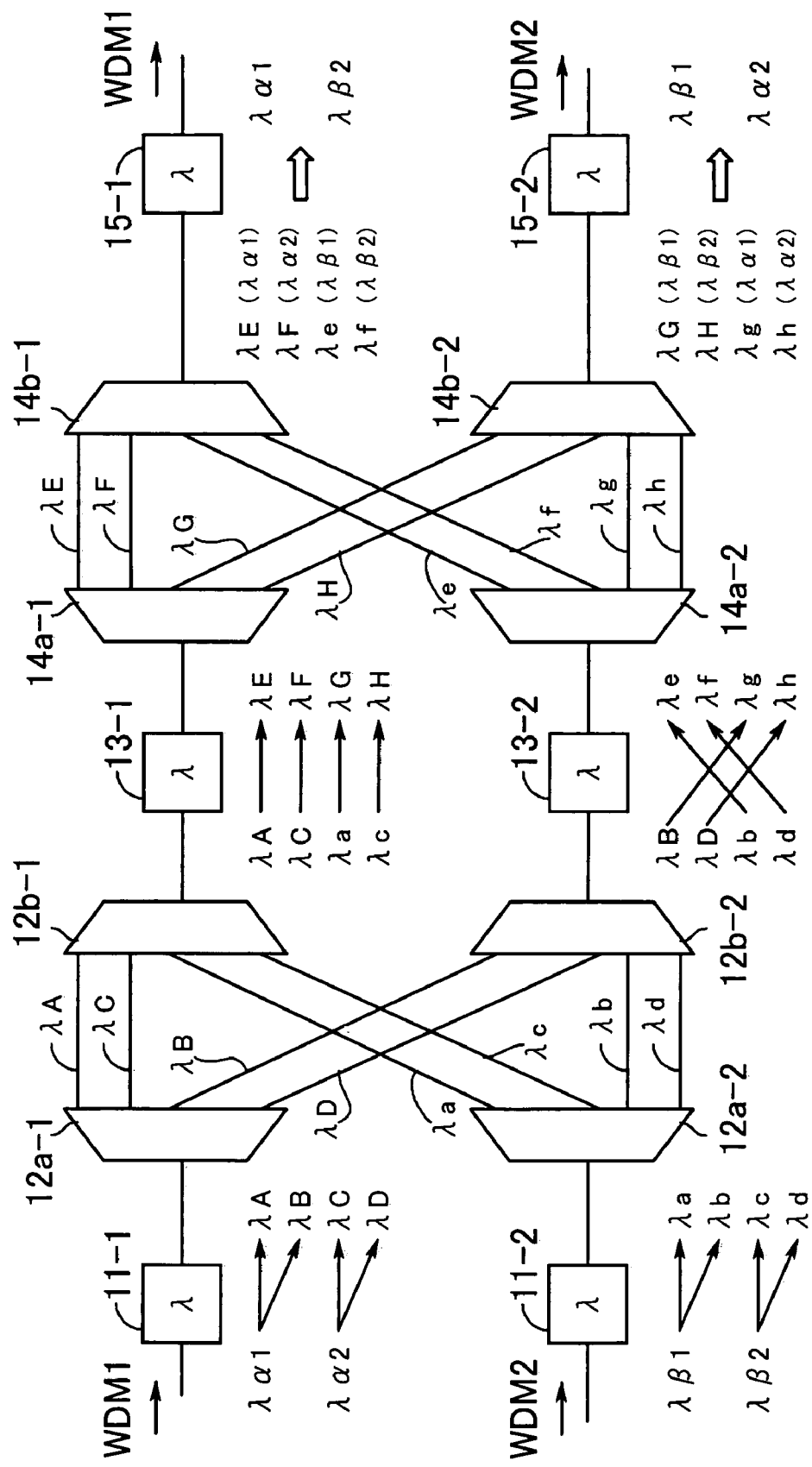
FIG. 2 is a view for describing the operation of a $\lambda$-based XC apparatus in the case of n=2 and m=2.

The flow of the operation of the optical crossconnect apparatus (hereinafter the optical cross-connect apparatus according to the present invention will also be called a λ-based XC apparatus) 10 will now be described by showing a simple example in which n=2 and m=2. FIG. 2 is a view for describing the operation of a λ-based XC apparatus in the case of n=2 and m=2. An optical signal inputted from the WDM1 route contains two different wavelengths λα1 and λα2. An optical signal inputted from the WDM2 route contains two different wavelengths λβ1 and λβ2.

In this example, it is assumed that an optical signal containing the different wavelengths λα1 and λβ2 is sent from the output side on the WDM1 route of the optical cross-connect apparatus after an optical cross-connection and that an optical signal containing the different wavelengths λβ1 and λα2 is sent from the output side on the WDM2 route of the optical cross-connect apparatus after the optical cross-connection.

The wavelength converter 11-1 converts λα1 to λA and λB and converts λα2 to λC and λD. That is to say, the wavelength converter 11-1 increases the number of wavelengths from two to four. The wavelength converter 11-2 converts λβ1 to λa and λb and converts λβ2 to λc and λd. That is to say, the wavelength converter 11-2 increases the number of wavelengths from two to four (m→2m).

The same wavelengths should not be sent via each of bundles of 2m/n lines by which the demultiplexers and the multiplexers are connected. In this example, the two wavelengths λA and λC are sent from the demultiplexer 12a-1 to the multiplexer 12b-1 via a bundle of two (=2×2/2) lines and the two wavelengths λB and λD are sent from the demultiplexer 12a-1 to the multiplexer 12b-2 via a bundle of two lines. Similarly, the two wavelengths λa and λc are sent from the demultiplexer 12a-2 to the multiplexer 12b-1 and the two wavelengths λb and λd are sent from the demultiplexer 12a-2 to the multiplexer 12b-2. Cross-connection is performed according to wavelengths and a multiplexed signal is outputted from each of the multiplexers 12b-1 and 12b-2.

"the same wavelengths should not be sent via each of bundles of lines by which the demultiplexers and the multiplexers are connected" means that when the demultiplexers and the multiplexers are connected, the same wavelengths should not be inputted to each multiplexer. That is to say, the same wavelengths should not be sent via each bundle of (2m/n) lines. For example, if λA and λB are sent from the demultiplexer 12*a*-1 to the multiplexer 12*b*-1, then the same λα1's will be inputted to the multiplexer 12*b*-1. As stated above, λA and λC therefore are sent from the demultiplexer 12*a*-1 to the multiplexer 12*b*-1 via a bundle of lines.

When the wavelength converter 13-1 receives the signal containing the different wavelengths λA, λC, λa, and λc, the wavelength converter 13-1 converts λA to λE, λC to λF, λa to λG, and λc to λH. When the wavelength converter 13-2 receives the signal containing the different wavelengths λB, λD, λb, and λd, the wavelength converter 13-2 converts λB to λg, λD to λh, λb to λe, and λd to λf. The number of wavelengths after the wavelength conversion is four and is the same as that of wavelengths before the wavelength conversion (2m→2m).

The two wavelengths λE and λF are sent from the demultiplexer 14*a*-1 to the multiplexer 14*b*-1 and the two wavelengths λG and λH are sent from the demultiplexer 14*a*-1 to the multiplexer 14*b*-2. Moreover, the two wavelengths λe and λf are sent from the demultiplexer 14*a*-2 to the multiplexer 14*b*-1 and the two wavelengths λg and λh are sent from the demultiplexer 14*a*-2 to the multiplexer 14*b*-2. Then a cross-connection is performed according to wavelengths and a multiplexed signal is outputted from each of the multiplexers 14*b*-1 and 14*b*-2.

When the wavelength converter 15-1 receives the signal containing the different wavelengths λE, λF, λe, and λf, the wavelength converter 15-1 converts λE and λf to λα1 and λβ2, respectively, and sends a signal containing the different wavelengths λα1 and λβ2 onto the WDM1 route. Moreover, when the wavelength converter 15-2 receives the signal containing the different wavelengths λG, λH, λg, and λh, the wavelength converter 15-2 converts λG and λh to λβ1 and λα2, respectively, and sends a signal containing the different wavelengths λβ1 and λα2 onto the WDM2 route.

Figure 3:
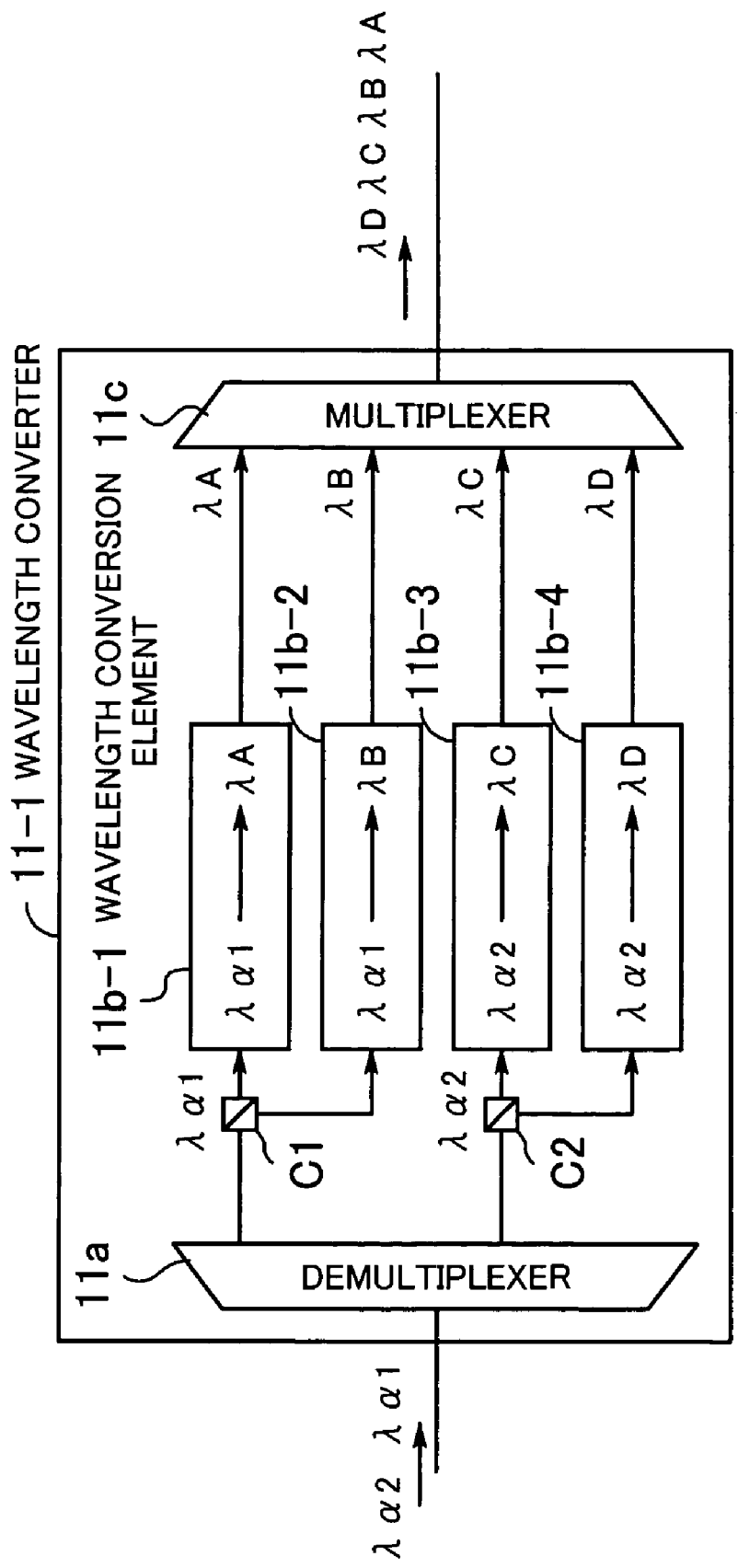
FIG. 3 shows the structure of a wavelength converter.
Figure 4:
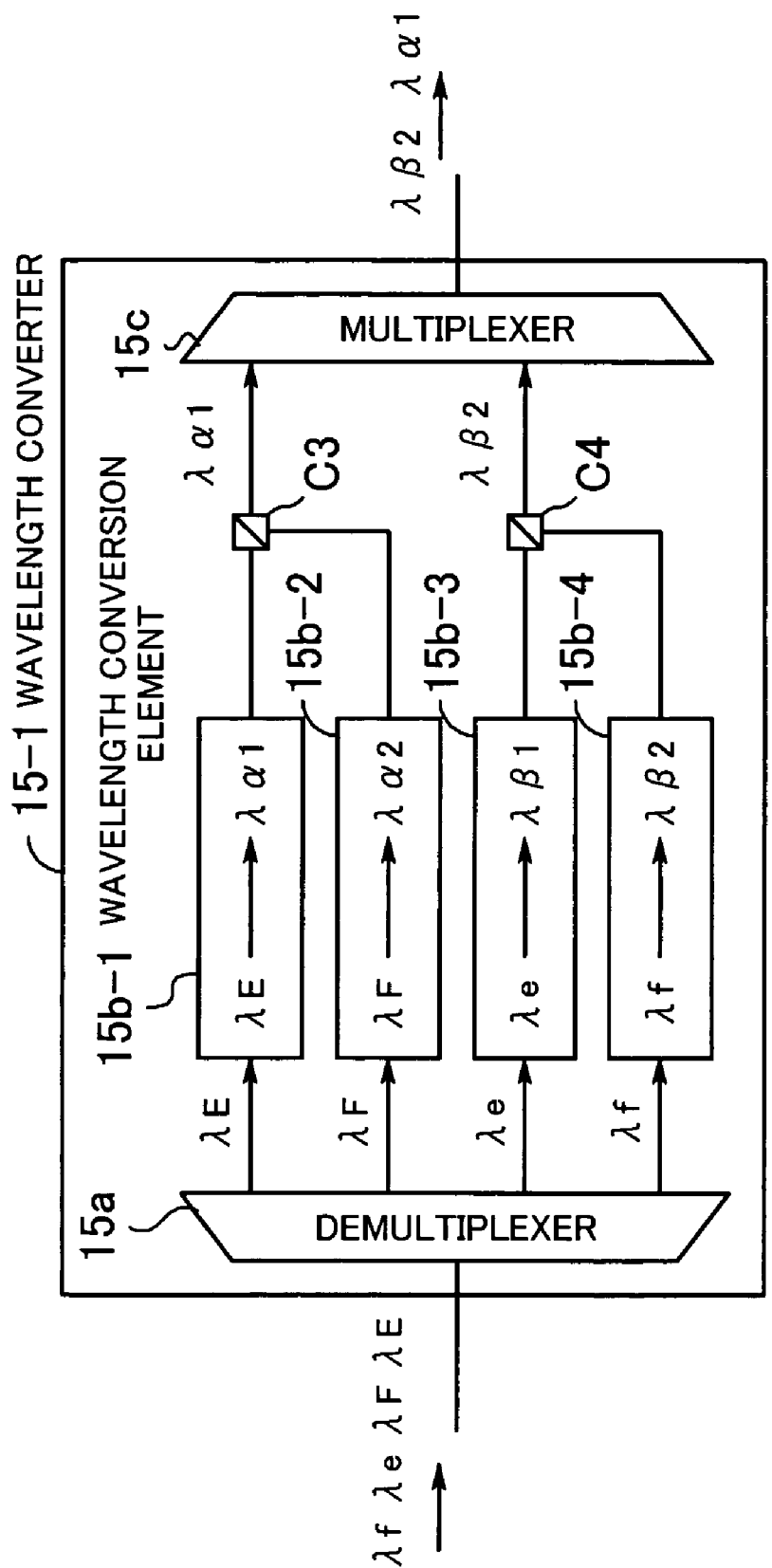
FIG. 4 shows the structure of a wavelength converter.

The structure of the wavelength converters will now be described. FIGS. 3 and 4 show the structure of the wavelength converters. The wavelength converters in the present invention include a demultiplexer, wavelength conversion elements, and a multiplexer (not only the wavelength converters 11, 13, and 15 shown in FIG. 1 but also the wavelength converters in the embodiments described later have the same structure).

FIG. 3 shows the structure of the wavelength converter 11-1 shown in FIG. 2. The wavelength converter 11-1 includes a demultiplexer 11*a*, wavelength conversion elements 11*b*-1 through 11*b*-4, a multiplexer 11*c*, and couplers C1 and C2. The demultiplexer 11*a* separates the different wavelengths λα1 and λα2 contained in the signal. The wavelength conversion element 11*b*-1 converts λα1 to λA and the wavelength conversion element 11*b*-2 converts λα1 to λB.

The wavelength conversion element 11*b*-3 converts λα2 to λC and the wavelength conversion element 11*b*-4 converts λα2 to λD. The multiplexer 11*c* combines and outputs signals with the wavelengths λA, λB, λC, and λD outputted from the wavelength conversion elements 11*b*-1 through 11*b*-4, respectively.

FIG. 4 shows the structure of the wavelength converter 15-1 shown in FIG. 2. The wavelength converter 15-1 includes a demultiplexer 15*a*, wavelength conversion elements 15*b*-1 through 15*b*-4, a multiplexer 15*c*, and couplers C3 and C4. The demultiplexer 15*a* separates the different wavelengths λE, λF, λe, and λf contained in the signal. The wavelength conversion element 15*b*-1 converts λE to λα1 and the wavelength conversion element 15*b*-2 converts λF to λα2.

The wavelength conversion element 15*b*-3 converts λe to λβ1 and the wavelength conversion element 15*b*-4 converts λf to λβ2. The wavelength conversion elements 15*b*-1 through 15*b*-4 operate in accordance with instructions from an upper layer. In this example, the multiplexer 15*c* combines and outputs a signal with the wavelength λα1 outputted from the wavelength conversion element 15*b*-1 via the coupler C3 and a signal with the wavelength λβ2 outputted from the wavelength conversion element 15*b*-4 via the coupler C4.

As described above, the number of wavelengths handled in the λ-based XC apparatus 10 is 2m which is twice the number (m) of input wavelengths. This means that the number of switching paths provided in the λ-based XC apparatus 10 is twice the number of input wavelengths (number of wavelengths=number of optical paths). These 2m wavelengths are allocated without performing a time division process and optical paths are switched by using a passive device, such as an AWG, as a multiplexer/demultiplexer. By doing so, optical cross-connection is realized.

As a result, compared with the conventional technique in which optical paths are switched spatially with MEMSes or the like, there are no limitations caused by difficulty in fabricating switching elements, the complexity of control, etc. Therefore, highly efficient optical cross-connection can be realized by performing large-scale switching.

Blocking type and non-blocking type switches will now be described. Switches are of two types: a blocking type and a non-blocking type. With blocking type switches, setting a path to a target port at switching time may cause congestion. With non-blocking type switches, congestion will not occur at switching time. The λ-based XC apparatus 10 described above is a complete non-blocking type switch and congestion will not occur. The difference between blocking type and non-blocking type switches and an example of the structure of a non-blocking type spatial switch will now be described.

Figure 5:
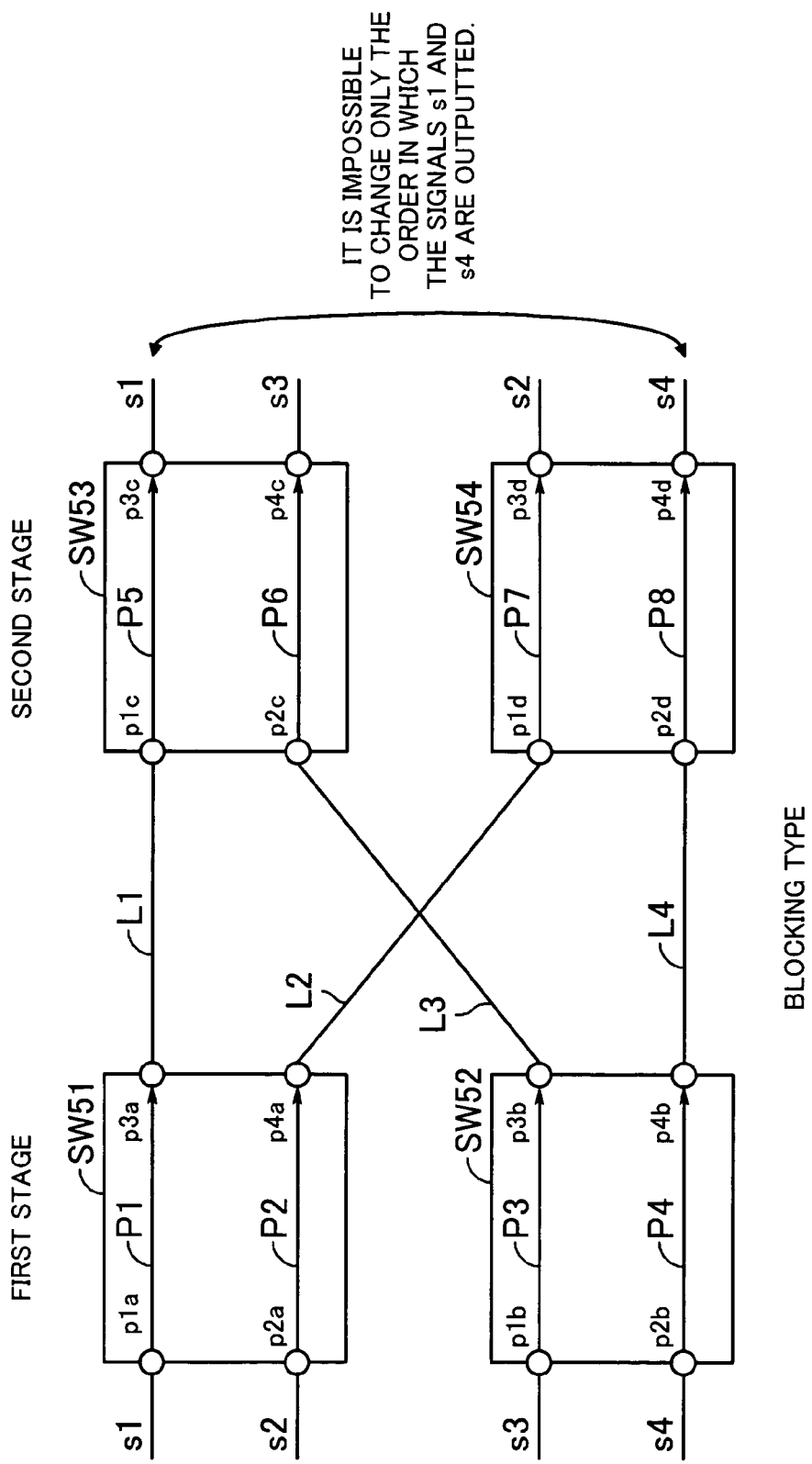
FIG. 5 shows an example of a blocking type switch.

FIG. 5 shows an example of a blocking type switch. A 4×4 switch includes four 2×2 switches SW51 through SW54 each having two incoming lines and two outgoing lines. The switches SW51 and SW52 are located at the first stage and the switches SW53 and SW54 are located at the second stage.

The switch SW51 has ports p1*a* and p2*a* on the incoming line side and ports p3*a* and p4*a* on the outgoing line side. The switch SW52 has ports p1*b* and p2*b* on the incoming line side and ports p3*b* and p4*b* on the outgoing line side. The switch SW53 has ports p1*c* and p2*c* on the incoming line side and ports p3*c* and p4*c* on the outgoing line side. The switch SW54 has ports p1*d* and p2*d* on the incoming line side and ports p3*d* and p4*d* on the outgoing line side.

The ports p3*a* and p1*c* connect with a line L1. The ports p4*a* and p1*d* connect with a line L2. The ports p3*b* and p2*c* connect with a line L3. The ports p4*b* and p2*d* connect with a line L4.

The directions of paths (switching paths) shown in FIG. 5 are as follows: a path P1 (port p1*a*→port p3*a*), a path P2 (port p2*a*→port p4*a*), a path P3 (port p1*b*→port p3*b*), a path P4 (port p2*b*→port p4*b*), a path P5 (port p1*c*→port p3*c*), a path P6 (port p2*c*→port p4*c*), a path P7 (port p1*d*→port p3*d*), and a path P8 (port p2*d*→port p4*d*).

Along these paths, incoming signals (s1, s2, s3, and s4) are inputted from the incoming line side of the switches SW51 and SW52 at the first stage, are switched by the switches at the first and second stages, and are outputted from the outgoing line side of the switches SW53 and SW54 at the second stage as outgoing signals in the order of s1, s3, s2, and s4.

In this case, it is assumed that switching is performed to change the order in which the incoming signals (s1, s2, s3, and s4) are outputted as outgoing signals from s1, s3, s2, and s4 to s4, s3, s2, and s1.

If the direction of the path P1 in the switch SW51 is port p1a→port p4a and the direction of the path P7 in the switch SW54 is port p1d→port p4d, then the signal s1 will be outputted from the port p4d because it will flow along the path P1, the line L2, and the path P7. On the other hand, if the direction of the path P4 in the switch SW52 is port p2b→port p3b and the direction of the path P6 in the switch SW53 is port p2c→port p3c, then the signal s4 will be outputted from the port p3c because it will flow along the path P4, the line L3, and the path P6.

However, if such switching operation is performed, congestion will occur in each switch (in the switch SW51, for example, the paths P1 and P2 will converge at the port p4a). Therefore, in the above case, it is impossible to change only the order in which the signals s1 and s4 are outputted. To change the order in which the signals s1 and s4 are outputted, the order in which the signals s2 and s3 are outputted must also be changed (finally, there is no choice but to output the incoming signals in the order of s4, s2, s3, and s1).

When outgoing lines corresponding to (m−1) incoming lines have been established in an m×m blocking type switch, the destination of the remaining path in a switch will be determined. In the switch SW51 in FIG. 5, for example, when the path P2 which connects with the line L2 has been established, the other path P1 inevitably connects with the line L1 (the number of lines in this example is the smallest). In blocking type switches having such structure, performing the switching of a signal will have an influence on another signal.

Figure 6:
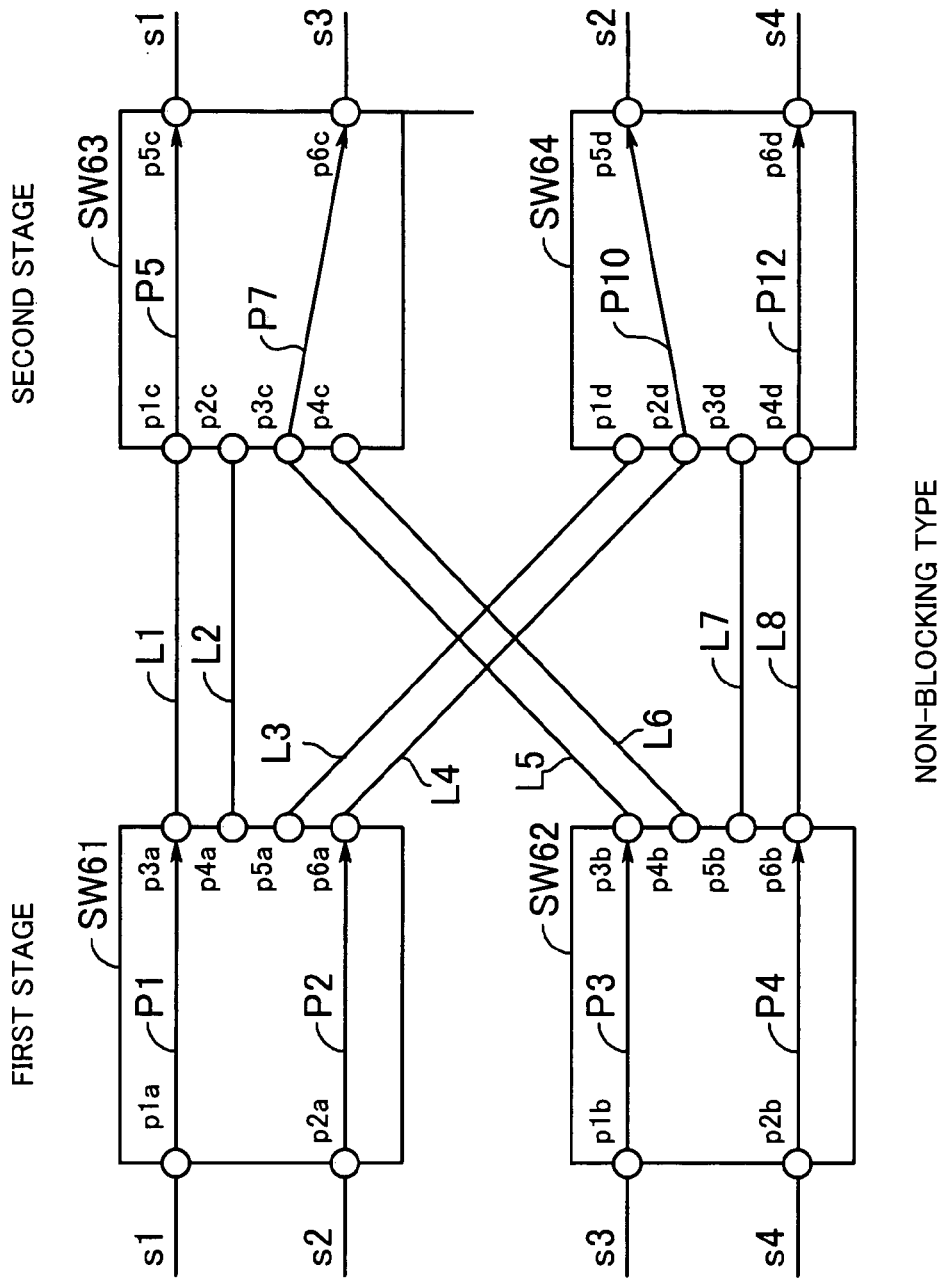
FIG. 6 shows an example of a non-blocking type switch.

FIG. 6 shows an example of a non-blocking type switch. A 4×4 switch includes four 2×4 switches SW61 through SW64 each having two incoming lines and four outgoing lines. The switches SW61 and SW62 are located at the first stage and the switches SW63 and SW64 are located at the second stage.

The switch SW61 has ports p1a and p2a on the incoming line side and ports p3a through p6a on the outgoing line side. The switch SW62 has ports p1b and p2b on the incoming line side and ports p3b through p6b on the outgoing line side. The switch SW63 has ports p1c through p4c on the incoming line side and ports p5c and p6c on the outgoing line side. The switch SW64 has ports p1d through p4d on the incoming line side and ports p5d and p6d on the outgoing line side.

The ports p3a and p1c connect with a line L1. The ports p4a and p2c connect with a line L2. The ports p5a and p1d connect with a line L3. The ports p6a and p2d connect with a line L4.

Moreover, the ports p3b and p3c connect with a line L5. The ports p4b and p4c connect with a line L6. The ports p5b and p3d connect with a line L7. The ports p6b and p4d connect with a line L8.

The directions of paths (switching paths) shown in FIG. 6 are as follows: a path P1 (port p1a→port p3a), a path P2 (port p2a→port p6a), a path P3 (port p1b→port p3b), a path P4 (port p2b→port p6b), a path P5 (port p1c→port p5c), a path P7 (port p3c→port p6c), a path P10 (port p2d→port p5d), and a path P12 (port p4d→port p6d).

Along these paths, incoming signals (s1, s2, s3, and s4) are inputted from the incoming line side of the switches SW61 and SW62 at the first stage, are switched by the switches at the first and second stages, and are outputted from the outgoing line side of the switches SW63 and SW64 at the second stage as outgoing signals in the order of s1, s3, s2, and s4.

In this case, it is assumed that switching is performed to change the order in which the incoming signals (s1, s2, s3, and s4) are outputted as outgoing signals from s1, s3, s2, and s4 to s4, s3, s2, and s1.

Figure 7:
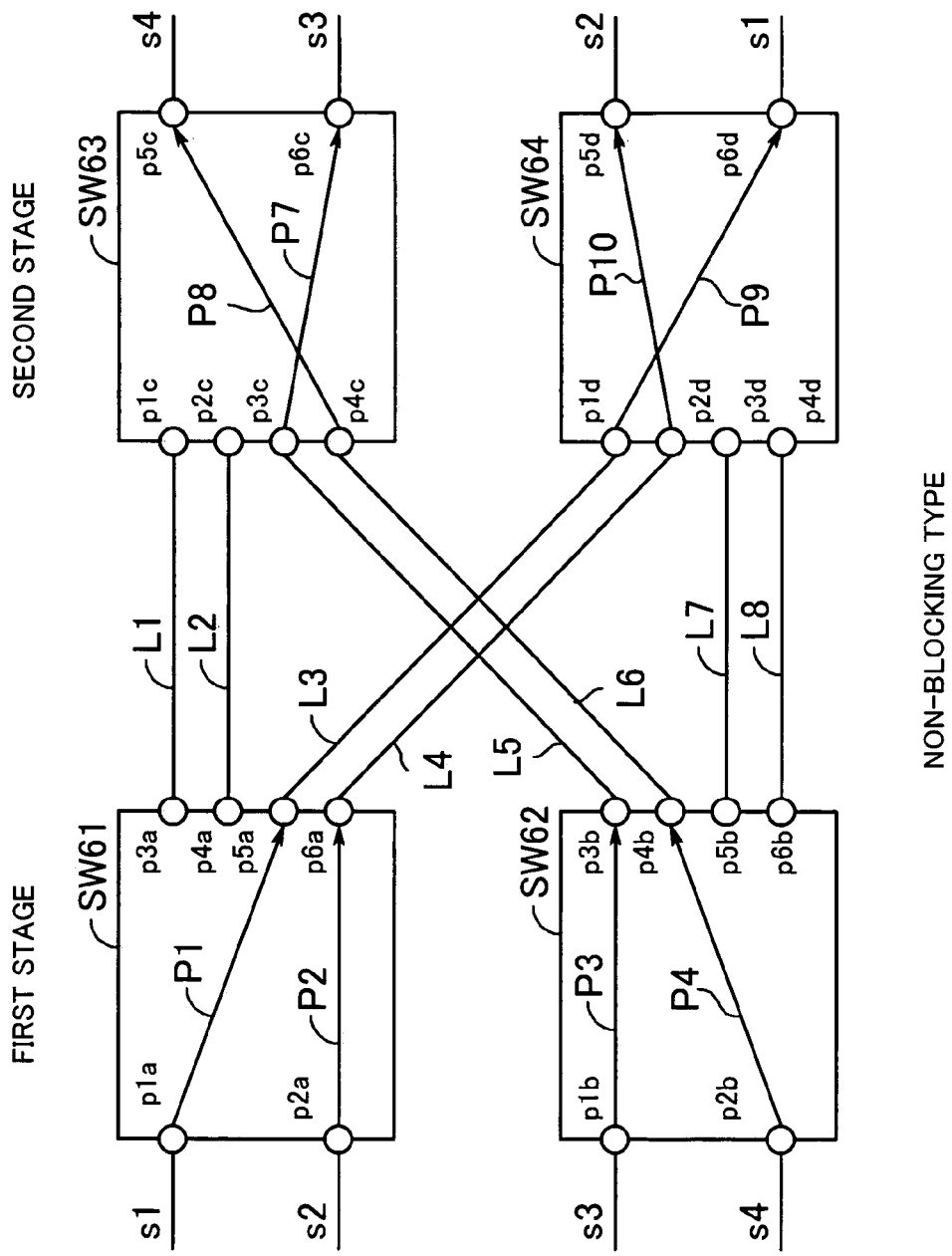
FIG. 7 shows the state of paths after switching.

FIG. 7 shows the state of paths after switching. If the direction of the path P1 in the switch SW61 is port p1a→port p5a and the direction of the path P9 in the switch SW64 is port p1d→port p6d, then the signal s1 will be outputted from the port p6d because it will flow along the path P1, the line L3, and the path P9. On the other hand, if the direction of the path P4 in the switch SW62 is port p2b→port p4b and the direction of the path P8 in the switch SW63 is port p4c→port p5c, then the signal s4 will be outputted from the port p5c because it will flow along the path P4, the line L6, and the path P8.

As can be seen from FIG. 7, even if such switching operation is performed, congestion will not occur in each switch (the paths along which the signals s3 and s2 flow are not changed). Therefore, only the order in which the signals s1 and s4 are outputted can be changed and the incoming signals (s1, s2, s3, and s4) can be outputted in the order of s4, s3, s2, and s1.

As stated above, switches each having incoming lines and outgoing lines the number of which is about twice that of the incoming lines should be combined to form a multistage structure. Then even when outgoing lines corresponding to (m−1) incoming lines have been established, the destination of the remaining path in a switch will not be determined inevitably. In the switch SW61 in FIG. 7, for example, even when the path P2 which connects with the line L4 has been established, the destination of the other path P1 can be selected from among the three remaining lines L1 through L3 (ports p3a through p5a). In non-blocking type switches having such structure, the switching of a signal can be performed freely without exerting an influence on another signal.

Figure 8:
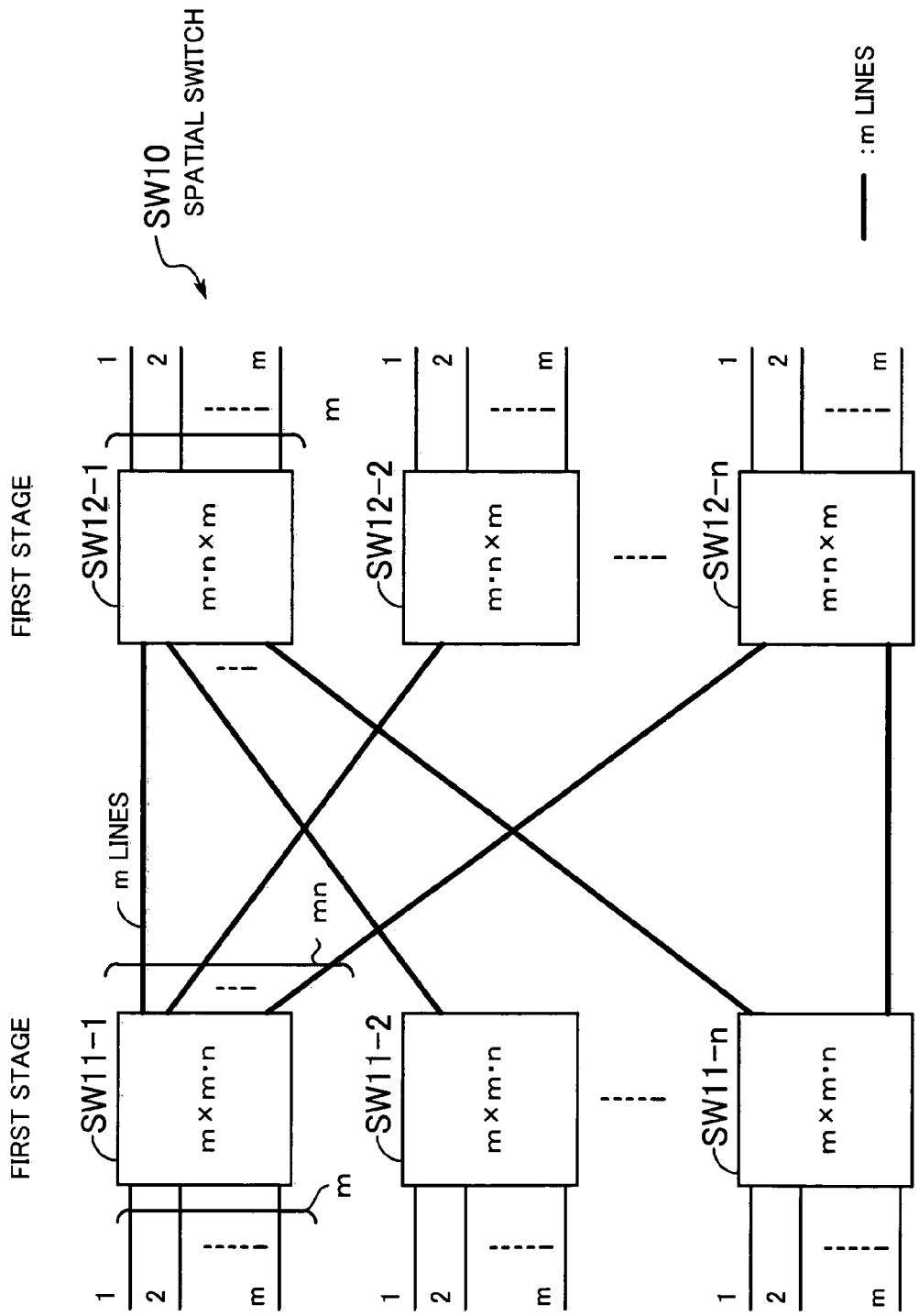
FIG. 8 shows the structure of a non-blocking type spatial switch.

Examples of a non-blocking type spatial switch will now be described with FIGS. 8 through 11. FIG. 8 shows the structure of a non-blocking type spatial switch. A spatial switch SW10 has a two-stage structure. The spatial switch SW10 is an (m×n)×(m×n) switch including switches SW11-1 through SW11-n at the first stage and switches SW12-1 through SW12-n at the second stage. Each of the switches SW11-1 through SW11-n is an m×(m×n) switch and has m incoming lines and mn outgoing lines. Each of the switches SW12-1 through SW12-n is an (m×n)×m switch and has mn incoming lines and m outgoing lines. The number of the m×(m×n) switches at the first stage is n and the number of the (m×n)×m switches at the second stage is n. Therefore, the total number of the m×(m×n) switches included in the spatial switch SW10 is 2n (the switches located at the first and second stages are the same).

The switch SW11-1 at the first stage has n bundles of m outgoing lines. These line bundles are connected to the switches SW12-1 through SW12-n, respectively, at the second stage. Similarly, the outgoing lines from the switches SW11-2 through SW11-n are connected to the switches SW12-1 through SW12-n at the second stage.

When outgoing lines corresponding to (m−1) incoming lines have been established in a unit switch (one of the switches SW11-1 through SW11-n) at the first stage, the number of paths which can be set for the remaining incoming line is calculated by subtracting (m−1) from the number of the outgoing lines:

$$mn-(m-1)=m(n-1)+1$$

One of these paths can be selected freely, so the spatial switch SW10 is of a non-blocking type.

Figure 9:
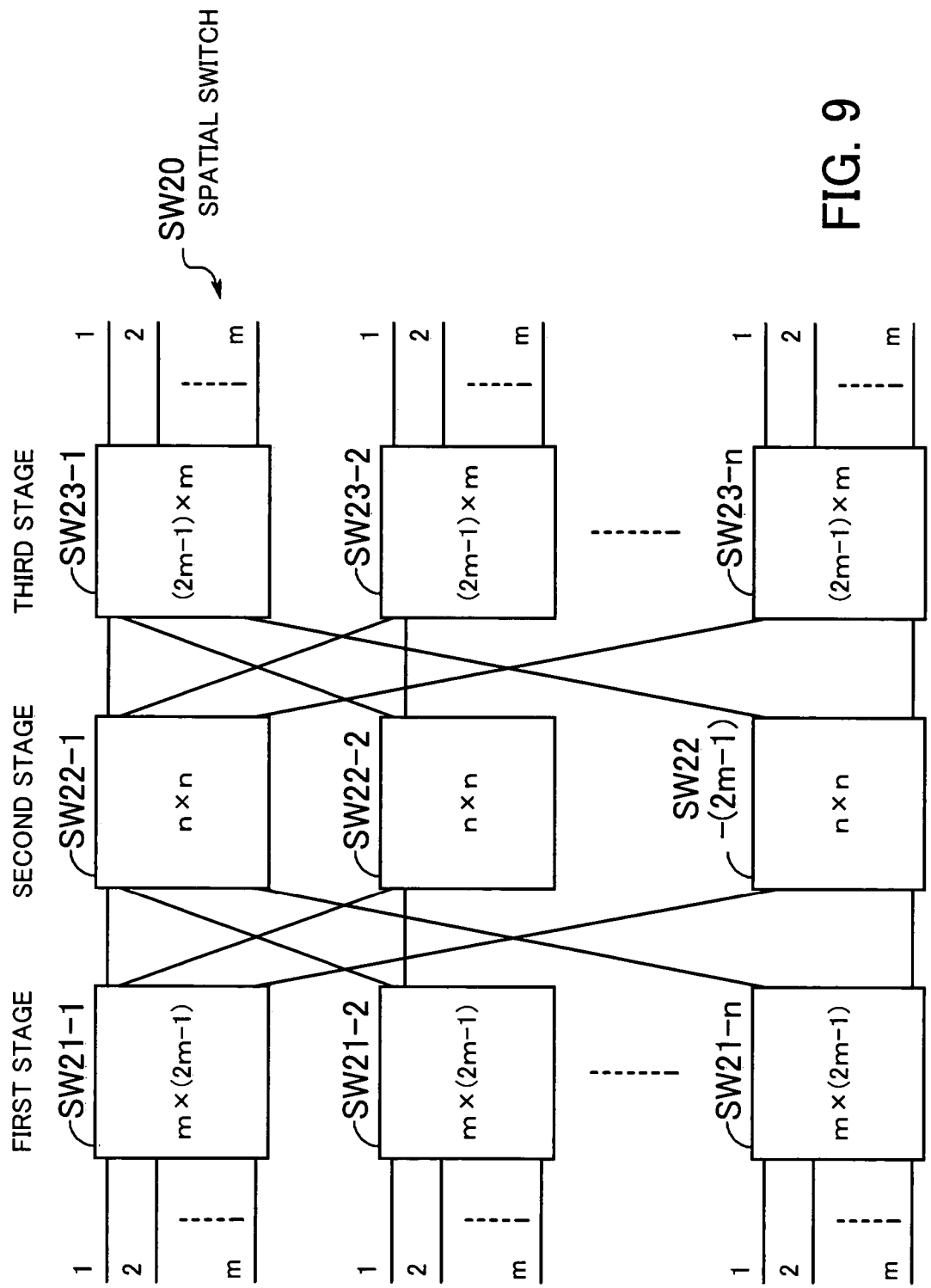
FIG. 9 shows the structure of a non-blocking type spatial switch.

FIG. 9 shows the structure of a non-blocking type spatial switch. A spatial switch SW20 has a three-stage structure. The spatial switch SW20 is an (m×n)×(m×n) switch including switches SW21-1 through SW21-n at the first stage, switches SW22-1 through SW22-(2m−1) at the second stage, and switches SW23-1 through SW23-n at the third stage. Each of the switches SW21-1 through SW21-n is an m×(2m−1) switch and has m incoming lines and (2m−1) outgoing lines. Each of the switches SW22-1 through SW22-(2m−1) is an n×n switch and has n incoming lines and n outgoing lines. Each of the switches SW23-1 through SW23-n is a (2m−1)×m switch and has (2m−1) incoming lines and m outgoing lines.

The number of the m×(2m−1) switches at the first stage is n, the number of the n×n switches at the second stage is (2m−1), and the number of the (2m−1)×m switches at the third stage is n. Therefore, the total number of the m×(2m−1) switches included in the spatial switch SW20 is 2n (the switches located at the first and third stages are the same) and the total number of the n×n switches included in the spatial switch SW20 is (2m−1).

The switch SW21-1 at the first stage has (2m−1) outgoing lines. These outgoing lines are connected to the switches SW22-1 through SW22-(2m−1), respectively, at the second stage. Similarly, the outgoing lines from the switches SW21-2 through SW21-n are connected to the switches SW22-1 through SW22-(2m−1) at the second stage.

The switch SW22-1 at the second stage has n outgoing lines. These outgoing lines are connected to the switches SW23-1 through SW23-n, respectively, at the third stage. Similarly, the outgoing lines from the switches SW22-2 through SW22-(2m−1) are connected to the switches SW23-1 through SW23-n at the third stage.

A unit switch at the first stage has (2m−1) outgoing lines, so the number of paths which go from the unit switch at the first stage to the (2m−1) switches SW22-1 through SW22-(2m−1) at the second stage is (2m−1). In addition, a unit switch at the third stage has (2m−1) incoming lines, so the number of paths which go from each of the (2m−1) switches SW22-1 through SW22-(2m−1) at the second stage to the unit switch at the third stage is (2m−1).

Therefore, even when outgoing lines corresponding to (m−1) incoming lines have been established in the switch at the first stage and outgoing lines corresponding to (m−1) incoming lines have been established in the switch at the third stage, m (obtained by subtracting (m−1) from (2m−1)) paths can be set from the first stage to the third stage. This means that the spatial switch SW20 is of a non-blocking type. A non-blocking type switch having a multi-stage structure is also called a Clos type switch (because it was proposed by Charles Clos).

Figure 10:
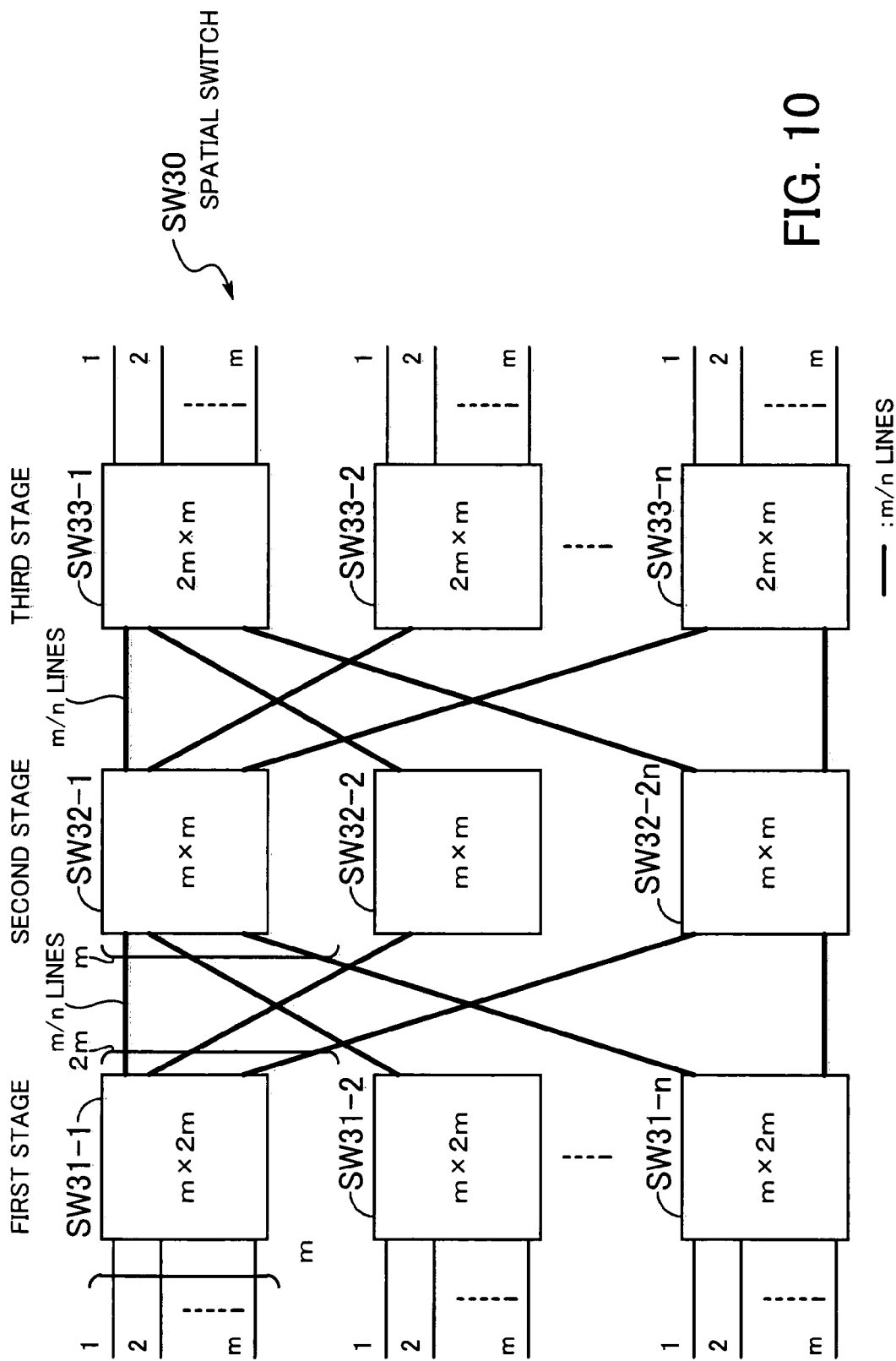
FIG. 10 shows the structure of a non-blocking type spatial switch.

FIG. 10 shows the structure of a non-blocking type spatial switch. A spatial switch SW30, being a modification of the spatial switch SW20 shown in FIG. 9, has a three-stage structure. The spatial switch SW30 is an (m×n)×(m×n) switch (m>n and m and n are even numbers) including switches SW31-1 through SW31-n at the first stage, switches SW32-1 through SW32-n at the second stage, and switches SW33-1 through SW33-n at the third stage. Each of the switches SW31-1 through SW31-n is an m×2m switch and has m incoming lines and 2m outgoing lines. Each of the switches SW32-1 through SW32-n is an m×m switch and has m incoming lines and m outgoing lines. Each of the switches SW33-1 through SW33-n is a 2m×m switch and has 2m incoming lines and m outgoing lines.

The number of the m×2m switches at the first stage is n, the number of the m×m switches at the second stage is 2n, and the number of the 2m×m switches at the third stage is n. Therefore, the total number of the m×2m switches included in the spatial switch SW30 is 2n (the switches located at the first and third stages are the same) and the total number of the m×m switches included in the spatial switch SW30 is 2n.

The switch SW31-1 at the first stage has 2m outgoing lines. These outgoing lines are bundled by (m/n)s (m/n is an integer) and are connected to the switches SW32-1 through SW32-n, respectively, at the second stage. Similarly, the outgoing lines from the switches SW31-2 through SW31-n are connected to the switches SW32-1 through SW32-2n at the second stage.

The switch SW32-1 at the second stage has m outgoing lines. These outgoing lines are bundled by (m/n)s and are connected to the switches SW33-1 through SW33-n, respectively, at the third stage. Similarly, the outgoing lines from the switches SW32-2 through SW32-n are connected to the switches SW33-1 through SW33-n at the third stage.

A unit switch at the first stage has 2m outgoing lines, so the number of paths which go from the unit switch at the first stage to the 2n switches SW32-1 through SW32-2n at the second stage is 2m. In addition, a unit switch at the third stage has 2m incoming lines, so the number of paths which go from each of the 2n switches SW32-1 through SW32-2*n* at the second stage to the unit switch at the third stage is 2m.

Therefore, even when outgoing lines corresponding to (m−1) incoming lines have been established in the switch at the first stage and outgoing lines corresponding to (m−1) incoming lines have been established in the switch at the third stage, (m+1) (obtained by subtracting (m−1) from 2m) paths can be set from the first stage to the third stage. This means that the spatial switch SW30 is of a non-blocking type.

Figure 11:
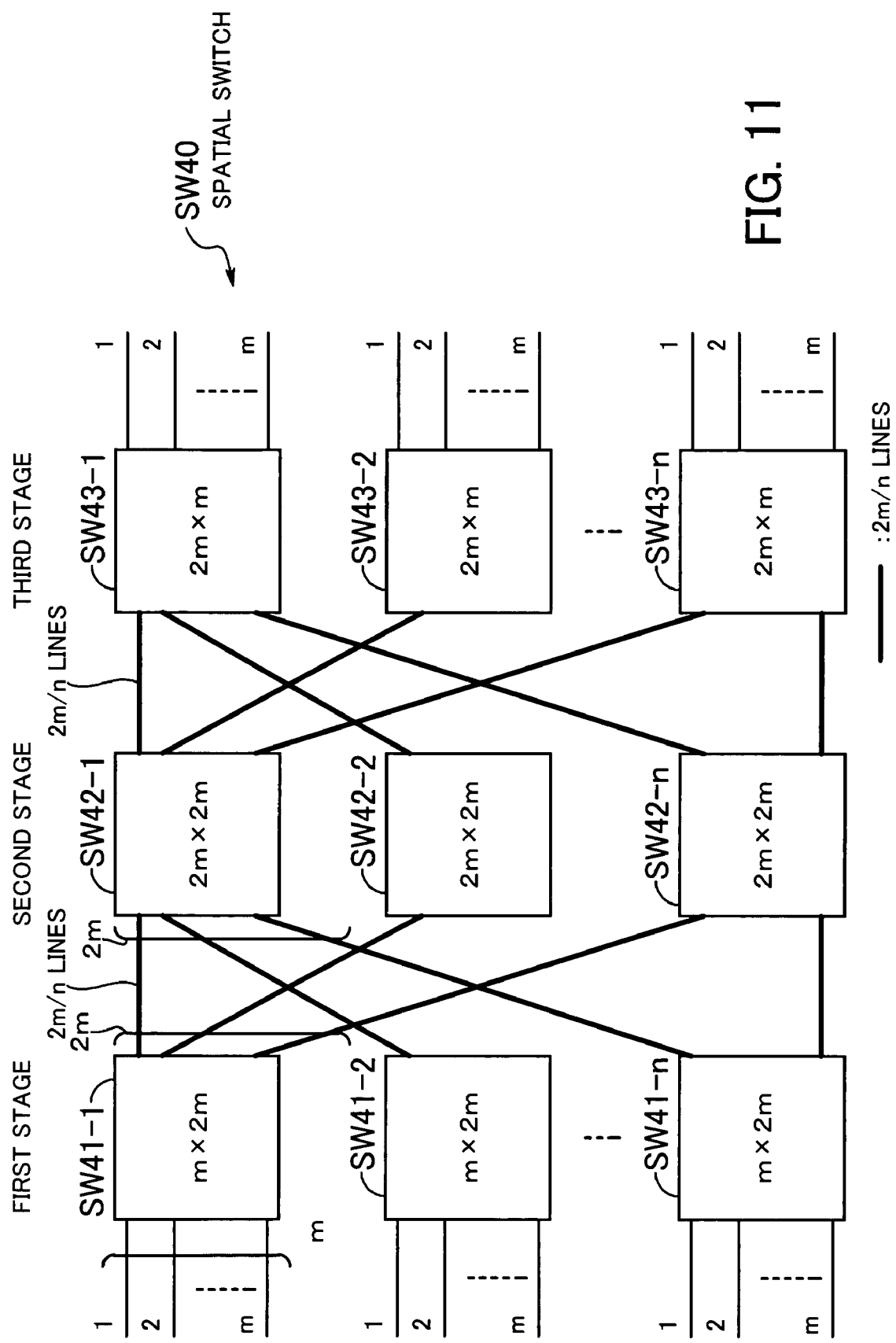
FIG. 11 shows the structure of a non-blocking type spatial switch.

FIG. 11 shows the structure of a non-blocking type spatial switch. A spatial switch SW40, being a modification of the spatial switch SW20 shown in FIG. 9, has a three-stage structure. The spatial switch SW40 is an (m×n)×(m×n) switch (m and n are even numbers) including switches SW41-1 through SW41-n at the first stage, switches SW42-1 through SW42-n at the second stage, and switches SW43-1 through SW43-n at the third stage. Each of the switches SW41-1 through SW41-n is an m×2m switch and has m incoming lines and 2m outgoing lines. Each of the switches SW42-1 through SW42-n is a 2m×2m switch and has 2m incoming lines and 2m outgoing lines. Each of the switches SW43-1 through SW43-n is a 2m×m switch and has 2m incoming lines and m outgoing lines.

The number of the m×2m switches at the first stage is n, the number of the 2m×2m switches at the second stage is n, and the number of the 2m×m switches at the third stage is n. Therefore, the total number of the m×2m switches included in the spatial switch SW40 is 2n (the switches located at the first and third stages are the same) and the total number of the 2m×2m switches included in the spatial switch SW40 is n (the number of the switches included in the spatial switch SW40 is smaller than that of the switches included in the spatial switch SW30 shown in FIG. 10).

The switch SW41-1 at the first stage has 2m outgoing lines. These outgoing lines are bundled by (2m/n)s (2m/n is an integer) and are connected to the switches SW42-1 through SW42-n, respectively, at the second stage. Similarly, the outgoing lines from the switches SW41-2 through SW41-n are connected to the switches SW42-1 through SW42-n at the second stage.

The switch SW42-1 at the second stage has 2m outgoing lines. These outgoing lines are bundled by (2m/n)s and are connected to the switches SW43-1 through SW43-n, respectively, at the third stage. Similarly, the outgoing lines from the switches SW42-2 through SW42-n are connected to the switches SW43-1 through SW43-n at the third stage.

A unit switch at the first stage has 2m outgoing lines, so the number of paths which go from the unit switch at the first stage to the n switches SW42-1 through SW42-n at the second stage is 2m. In addition, a unit switch at the third stage has 2m incoming lines, so the number of paths which go from each of the n switches SW42-1 through SW42-n at the second stage to the unit switch at the third stage is 2m.

Therefore, even when outgoing lines corresponding to (m−1) incoming lines have been established in the switch at the first stage and outgoing lines corresponding to (m−1) incoming lines have been established in the switch at the third stage, (m+1) (obtained by subtracting (m−1) from 2m) paths can be set from the first stage to the third stage. This means that the spatial switch SW40 is of a non-blocking type.

Figure 12:
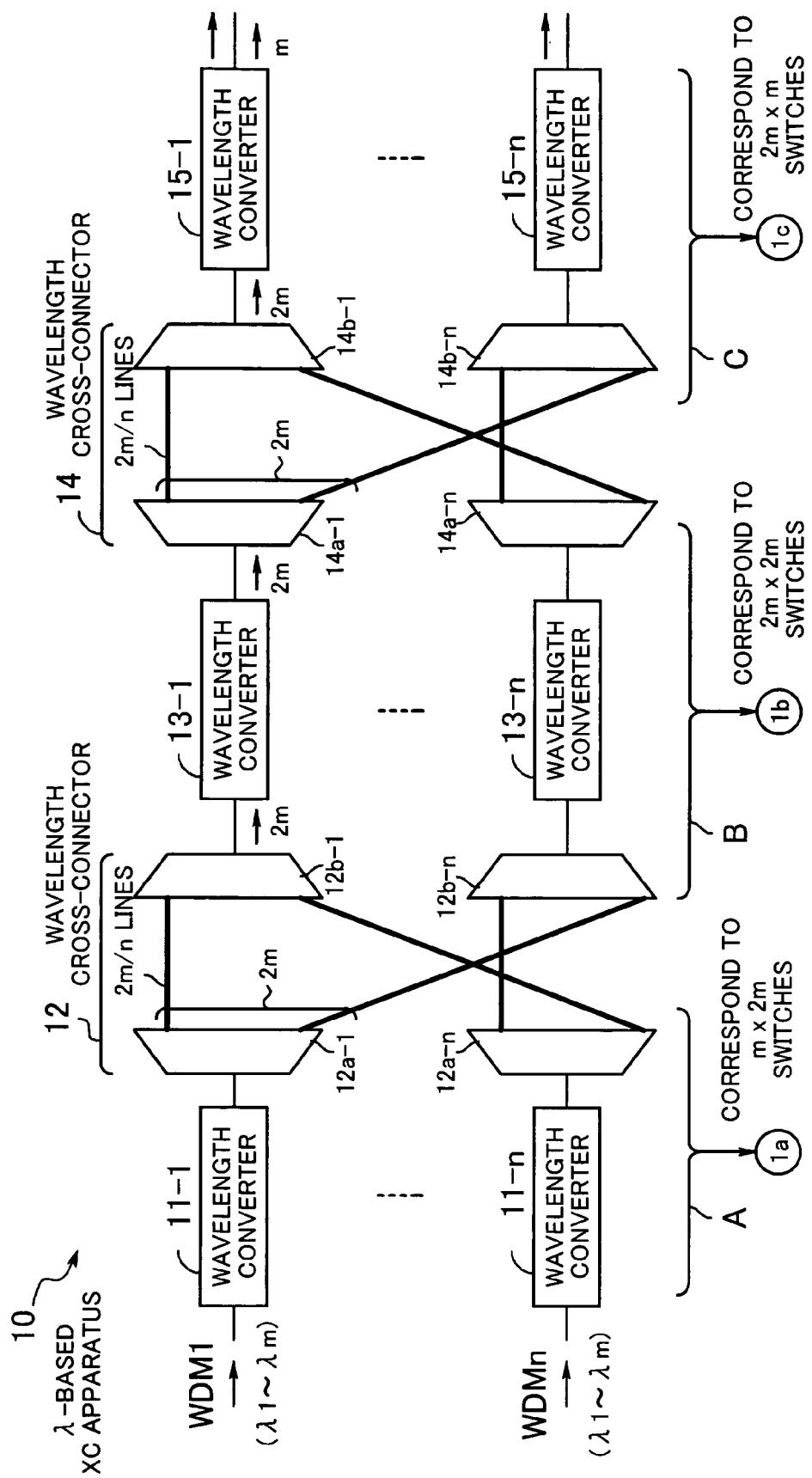
FIG. 12 shows the correspondence between a $\lambda$-based XC apparatus and a spatial switch.
Figure 13:
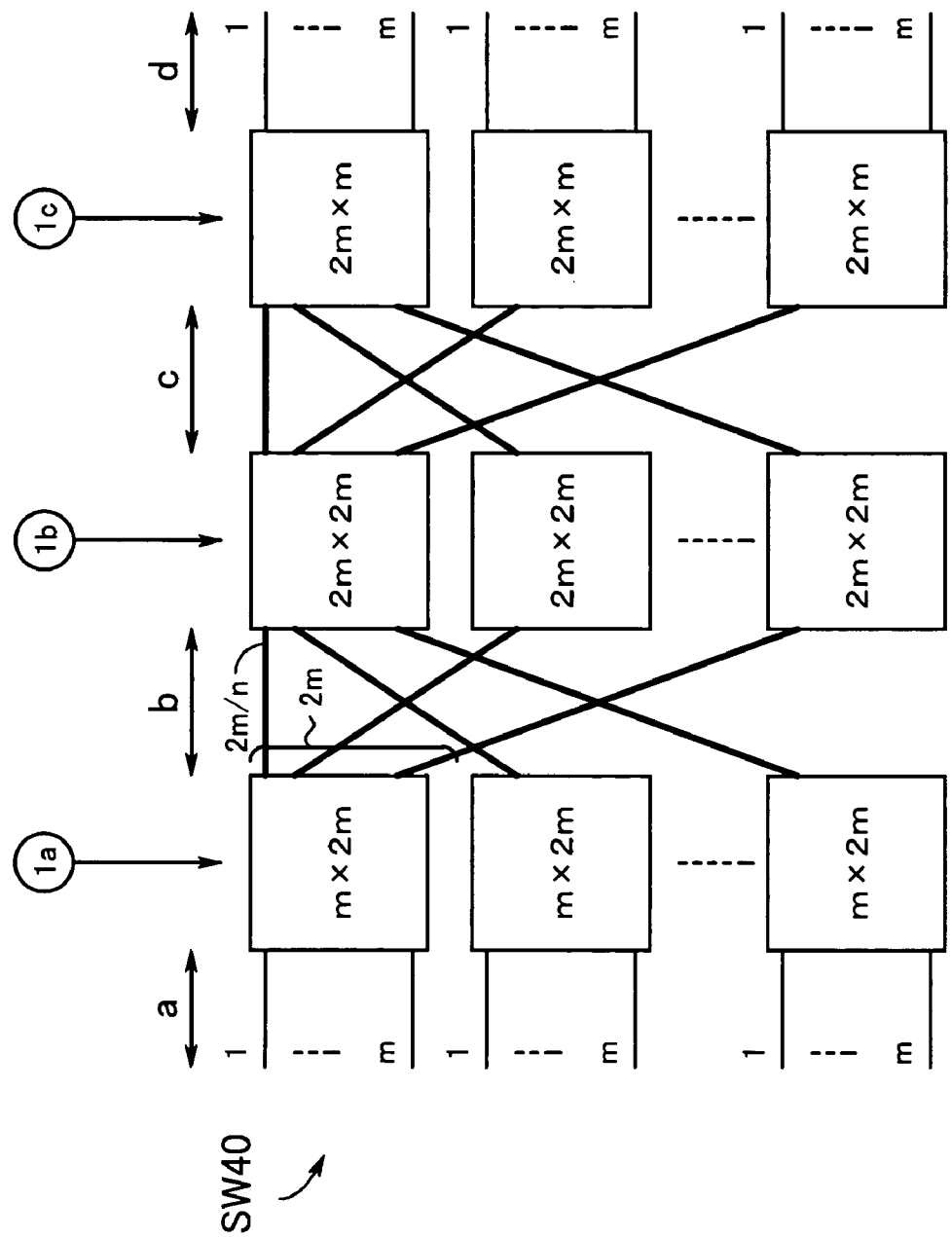
FIG. 13 shows the correspondence between a $\lambda$-based XC apparatus and a spatial switch.

The correspondence between the λ-based XC apparatus 10 and the spatial switch SW40 shown in FIG. 11 will now be described. FIGS. 12 and 13 show the correspondence between the λ-based XC apparatus 10 and the spatial switch SW40. An area A in the λ-based XC apparatus 10 from the input side of the wavelength converter 11 to the output side of the demultiplexer 12a in the wavelength cross-connector 12 corresponds to the m×2m switches at the first stage in the spatial switch SW40.

An area B from the input side of the multiplexer 12b in the wavelength cross-connector 12 to the output side of the demultiplexer 14a in the wavelength cross-connector 14 corresponds to the 2m×2m switches at the second stage in the spatial switch SW40. An area C from the input side of the multiplexer 14b in the wavelength cross-connector 14 to the output side of the wavelength converter 15 corresponds to the 2m×m switches at the third stage in the spatial switch SW40.

One physical input line WDM is connected to each wavelength converter 11 in the λ-based XC apparatus 10, but the m wavelengths λ1 through λm are sent via it. Therefore, by taking the number of wavelengths sent into consideration, one physical input line can be considered m signal input lines. This number is equal to that of the incoming lines of each m×2m switch in an area a in the spatial switch SW40.

The output fibers of each of the n demultiplexer 12a are bundled by (2m/n)s and are connected to the n multiplexer 12b, respectively. This is the same as the correspondence in an area b in the spatial switch SW40 between the outgoing lines of the m×2m switches and the incoming lines of the 2m×2m switches.

The output fibers of each of the n demultiplexer 14a are bundled by (2m/n)s and are connected to the n multiplexer 14b, respectively. This is the same as the correspondence in an area c in the spatial switch SW40 between the outgoing lines of the 2m×2m switches and the incoming lines of the 2m×m switches.

One physical output line WDM is connected to each wavelength converter 15 in the λ-based XC apparatus 10, but the m wavelengths λ1 through λm are sent over it. Accordingly, by taking the number of wavelengths sent into consideration, one physical output line can be considered m signal output lines. This number is equal to that of the outgoing lines of each 2m×m switch in an area d in the spatial switch SW40. That is to say, the λ-based XC apparatus 10 is equal to the spatial switch SW40 in structure and therefore is a non-blocking type switch.

With the λ-based XC apparatus according to the present invention, optical paths are switched according to wavelengths by applying a switching theory underlying a non-blocking type spatial switch without using a spatial switch.

Figure 14:
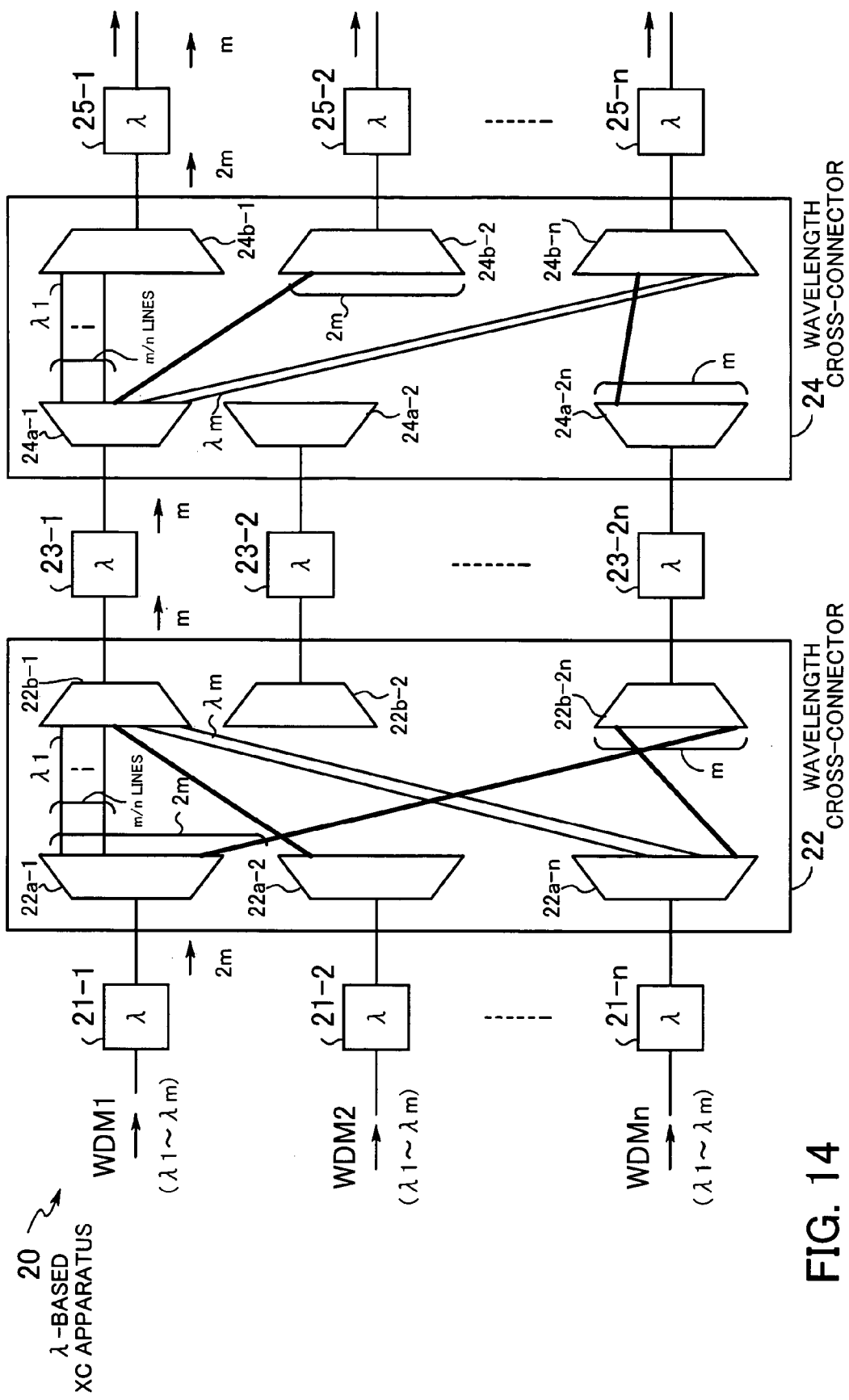
FIG. 14 shows the structure of a $\lambda$-based XC apparatus according to a second embodiment.

A λ-based XC apparatus according to a second embodiment of the present invention will now be described. FIG. 14 shows the structure of a λbased XC apparatus according to a second embodiment. The structure of the non-blocking type spatial switch SW30 shown in FIG. 10 is applied to a λ-based XC apparatus 20.

n wavelength converters 21-1 through 21-n convert m different wavelengths λ1 through λm contained in input WDM signals into 2m wavelengths λ1 through λ2m.

A wavelength cross-connector 22 includes demultiplexers 22a-1 through 22a-n and multiplexers 22b-1 through 22b-2n and performs cross-connection according to wavelengths. The n demultiplexers 22a-1 through 22a–nseparate the optical signals wavelength-converted by the wavelength converters 21-1 through 21-n into 2m different wavelengths. The 2n multiplexers 22b-1 through 22b-2n combine optical signals with m different wavelengths. The same wavelengths should not be sent via each of bundles of m/n lines by which the demultiplexers 22a-1 through 22a–nand the multiplexers 22b-1 through 22b-2n are connected (each thick solid line in FIG. 14 indicates a bundle of m/n lines).

2n wavelength converters 23-1 through 23-2n convert the m different wavelengths contained in the optical signals cross-connected by the wavelength cross-connector 22 into m wavelengths.

A wavelength cross-connector 24 includes demultiplexers 24a-1 through 24a-2n and multiplexers 24b-1 through 24b-n and performs cross-connection according to wavelengths. The 2n demultiplexers 24a-1 through 24a-2n separate the optical signals wavelength-converted by the wavelength converters 23-1 through 23-2n into m different wavelengths. The n multiplexers 24b-1 through 24b-n combine optical signals with 2m different separated wavelengths. The same wavelengths should not be sent via each of bundles of m/n lines by which the demultiplexers 24a-1 through 24a-2n and the multiplexers 24b-1 through 24b-n are connected.

n wavelength converters 25-1 through 25-n convert the 2m different wavelengths λ1 through λ2m contained in the optical signals cross-connected by the wavelength cross-connector 24 into m wavelengths λ1 through λm and send them.

Figure 15:
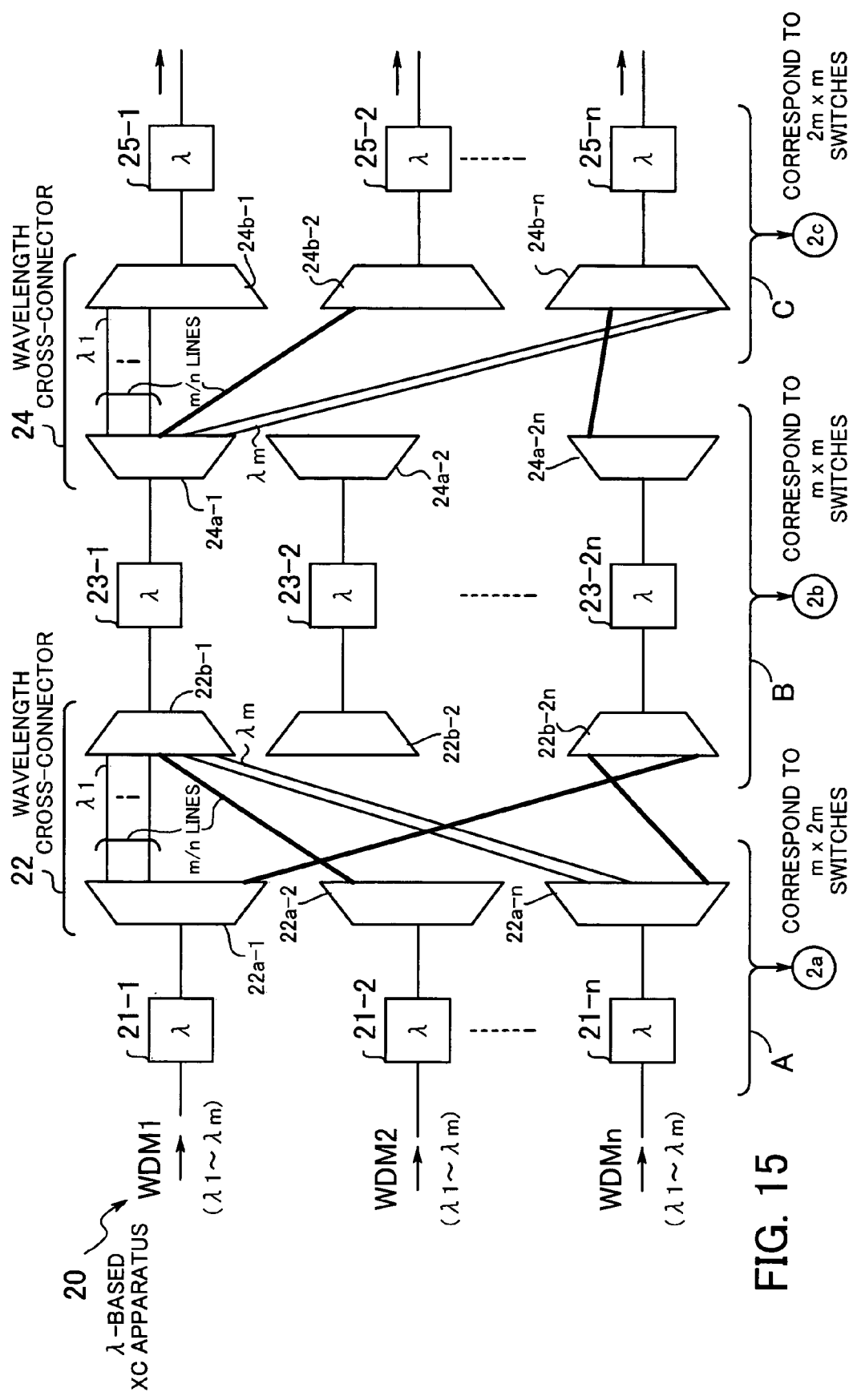
FIG. 15 shows the correspondence between a $\lambda$-based XC apparatus and a spatial switch.
Figure 16:
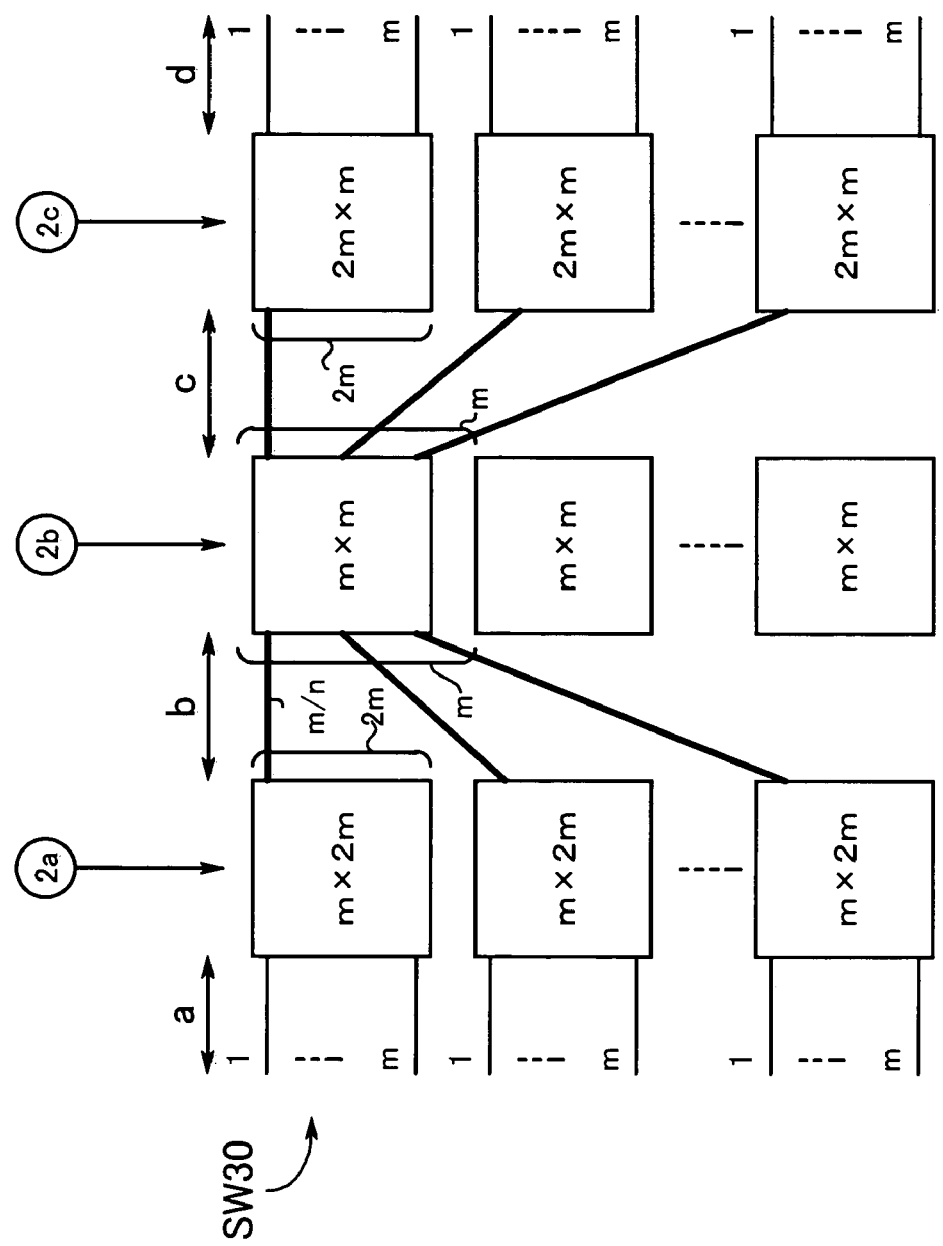
FIG. 16 shows the correspondence between a $\lambda$-based XC apparatus and a spatial switch.

The correspondence between the λ-based XC apparatus 20 and the spatial switch SW30 will now be described. FIGS. 15 and 16 show the correspondence between the λ-based XC apparatus 20 and the spatial switch SW30. An area A in the λ-based XC apparatus 20 from the input side of the wavelength converter 21 to the output side of the demultiplexer 22a in the wavelength cross-connector 22 corresponds to the m×2m switches at the first stage in the spatial switch SW30.

An area B from the input side of the multiplexer 22b in the wavelength cross-connector 22 to the output side of the demultiplexer 24a in the wavelength cross-connector 24 corresponds to the m×m switches at the second stage in the spatial switch SW30. An area C from the input side of the multiplexer 24b in the wavelength cross-connector 24 to the output side of the wavelength converter 25 corresponds to the 2m×m switches at the third stage in the spatial switch SW30.

One physical input line WDM is connected to each wavelength converter 21 in the λ-based XC apparatus 20, but the m wavelengths λ1 through λm are sent via it. Accordingly, by taking the number of wavelengths sent into consideration, one physical input line can be considered m signal input lines. This number is equal to that of the incoming lines of each m×2m switch in an area a in the spatial switch SW30.

The output fibers of each of the n demultiplexer 22a are bundled by (m/n)s and are connected to the 2n multiplexer 22b, respectively. This is the same as the correspondence in an area b in the spatial switch SW30 between the outgoing lines of the m×2m switches and the incoming lines of the m×m switches.

The output fibers of each of the 2n demultiplexer 24a are bundled by (m/n)s and are connected to the n multiplexer 24b, respectively. This is the same as the correspondence in an area c in the spatial switch SW30 between the outgoing lines of the m×m switches and the incoming lines of the 2m×m switches.

One physical output line WDM is connected to each wavelength converter 25 in the λ-based XC apparatus 20, but the m wavelengths λ1 through λm are sent via it. Accordingly, by taking the number of wavelengths sent into consideration, one physical output line can be considered m signal output lines. This number is equal to that of the outgoing lines of each 2m×m switch in an area d in the spatial switch SW30. That is to say, the λ-based XC apparatus 20 is equal to the spatial switch SW30 in structure and therefore is a non-blocking type switch.

Figure 17:
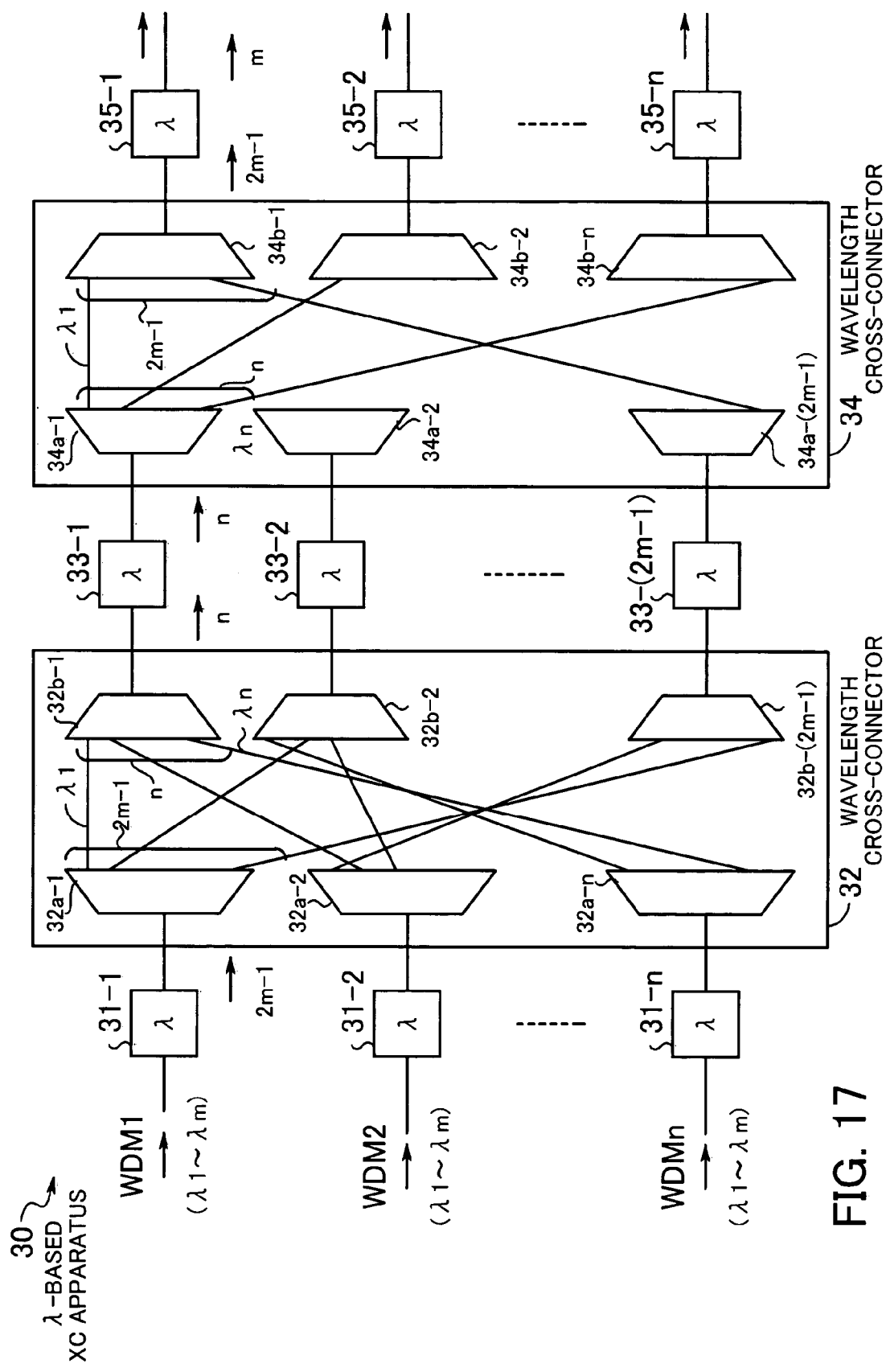
FIG. 17 shows the structure of a $\lambda$-based XC apparatus according to a third embodiment.

A λ-based XC apparatus according to a third embodiment of the present invention will now be described. FIG. 17 shows the structure of a λ-based XC apparatus according to a third embodiment. The structure of the non-blocking type spatial switch SW20 shown in FIG. 9 is applied to a λ-based XC apparatus 30.

n wavelength converters 31-1 through 31-n convert m different wavelengths λ1 through λm contained in input WDM signals into (2m−1) wavelengths λ1 through λ2m−1.

A wavelength cross-connector 32 includes demultiplexers 32a-1 through 32a-n and multiplexers 32b-1 through 32b-(2m−1) and performs cross-connection according to wavelengths. The n demultiplexers 32a-1 through 32a-n separate the optical signals wavelength-converted by the wavelength converters 31-1 through 31-n into (2m−1) different wavelengths. The (2m−1) multiplexers 32b-1 through 32b-(2m−1) combine optical signals with n different wavelengths. Each of the demultiplexers 32a-1 through 32a-n is connected to each of the multiplexers 32b-1 through 32b-(2m−1) by one line.

(2m−1) wavelength converters 33-1 through 33-(2m−1) convert the n different wavelengths contained in the optical signals cross-connected by the wavelength cross-connector 32 into n wavelengths.

A wavelength cross-connector 34 includes demultiplexers 34a-1 through 34a-(2m−1) and multiplexers 34b-1 through 34b-n and performs cross-connection according to wavelengths. The (2m−1) demultiplexers 34a-1 through 34a-(2m−1) separate the optical signals wavelength-converted by the wavelength converters 33-1 through 33-(2m−1) into n different wavelengths. The n multiplexers 34b-1 through 34b-n combine optical signals with (2m−1) different separated wavelengths. Each of the demultiplexers 34a-1 through 34a-(2m−1) is connected to each of the multiplexers 34b-1 through 34b-n by one line.

Wavelength converters 35-1 through 35-n convert the (2m−1) different wavelengths λ1 through λ2m−1 contained in the optical signals cross-connected by the wavelength cross-connector 34 into m wavelengths λ1 through λm and send them.

Figure 18:
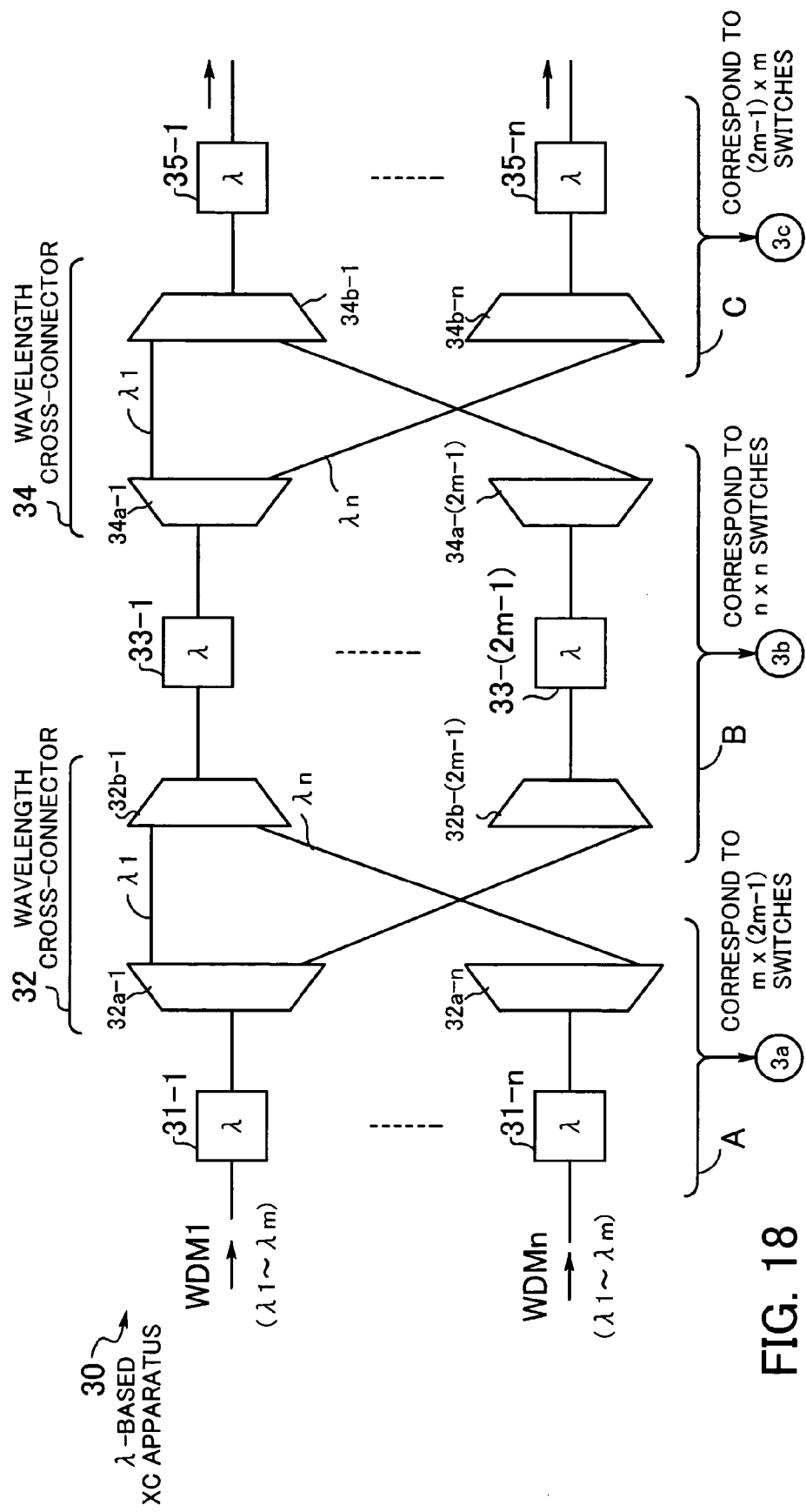
FIG. 18 shows the correspondence between a λ-based XC apparatus and a spatial switch.
Figure 19:
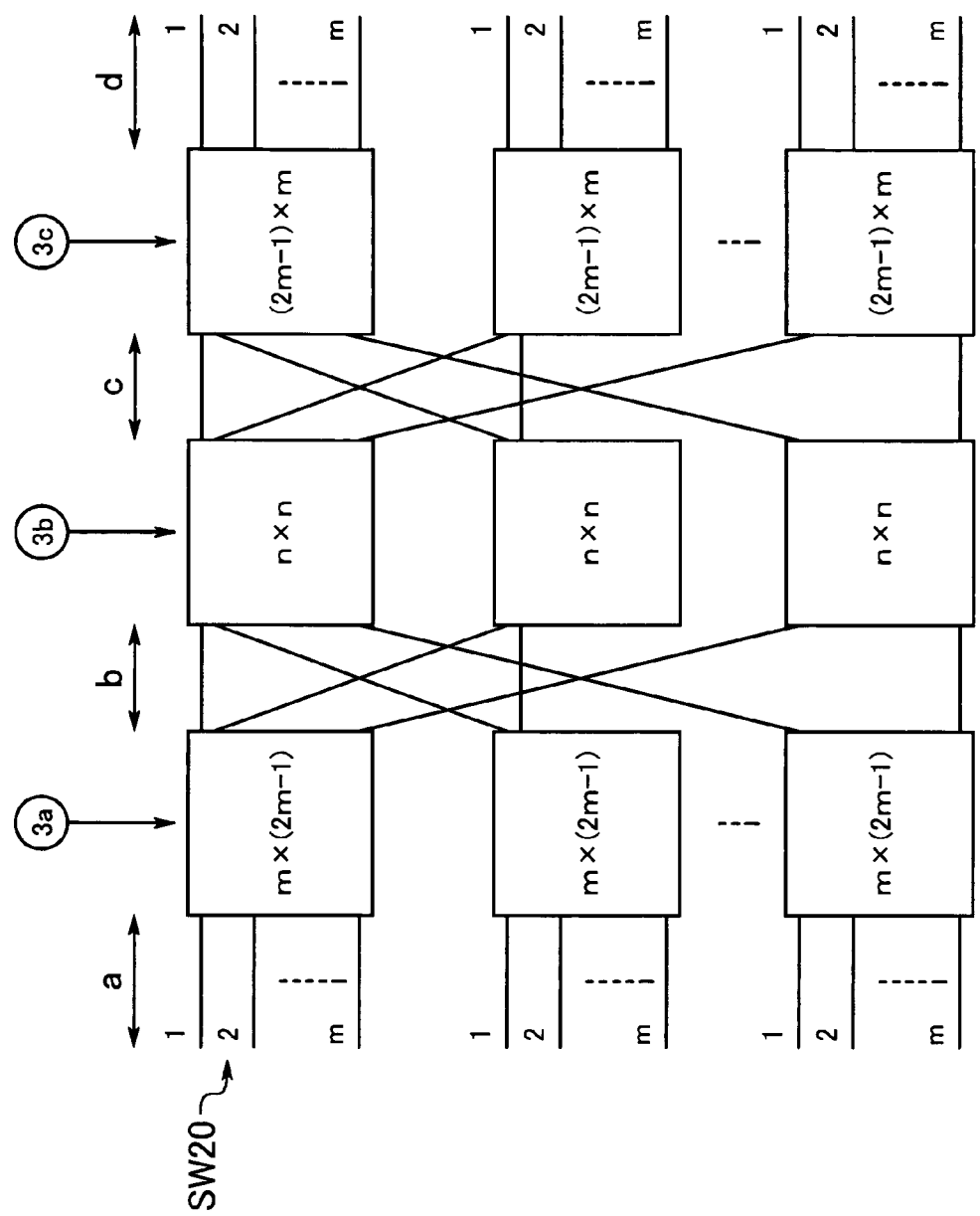
FIG. 19 shows the correspondence between a λ-based XC apparatus and a spatial switch.

The correspondence between the λ-based XC apparatus 30 and the spatial switch SW20 will now be described. FIGS. 18 and 19 show the correspondence between the λ-based XC apparatus 30 and the spatial switch SW20. An area A in the λ-based XC apparatus 30 from the input side of the wavelength converter 31 to the output side of the demultiplexer 32a in the wavelength cross-connector 32 corresponds to the m×(2m−1) switches at the first stage in the spatial switch SW20.

An area B from the input side of the multiplexer 32b in the wavelength cross-connector 32 to the output side of the demultiplexer 34a in the wavelength cross-connector 34 corresponds to the n×n switches at the second stage in the spatial switch SW20. An area C from the input side of the multiplexer 34b in the wavelength cross-connector 34 to the output side of the wavelength converter 35 corresponds to the (2m−1)×m switches at the third stage in the spatial switch SW20.

One physical input line WDM is connected to each wavelength converter 31 in the λ-based XC apparatus 30, but the m wavelengths λ1 through λm are sent via it. Accordingly, by taking the number of wavelengths sent into consideration, one physical input line can be considered m signal input lines. This number is equal to that of the incoming lines of each m×(2m−1) switch in an area a in the spatial switch SW20.

Each of the n demultiplexer 32a is connected to each of the (2m−1) multiplexer 32b by one output fiber. This is the same as the correspondence in an area b in the spatial switch SW20 between the outgoing lines of the m×(2m−1) switches and the incoming lines of the n×n switches.

Each of the (2m−1) demultiplexer 34a is connected to each of the n multiplexer 34b by one output fiber. This is the same as the correspondence in an area c in the spatial switch SW20 between the outgoing lines of the n×n switches and the incoming lines of the (2m−1)×m switches.

One physical output line WDM is connected to each wavelength converter 35 in the A-based XC apparatus 30, but the m wavelengths λ1 through λm are sent via it. Accordingly, by taking the number of wavelengths sent into consideration, one physical output line can be considered m signal output lines. This number is equal to that of the outgoing lines of each (2m−1)×m switch in an area d in the spatial switch SW20. That is to say, the λ-based XC apparatus 30 is equal to the spatial switch SW20 in structure and therefore is a non-blocking type switch.

Figure 20:
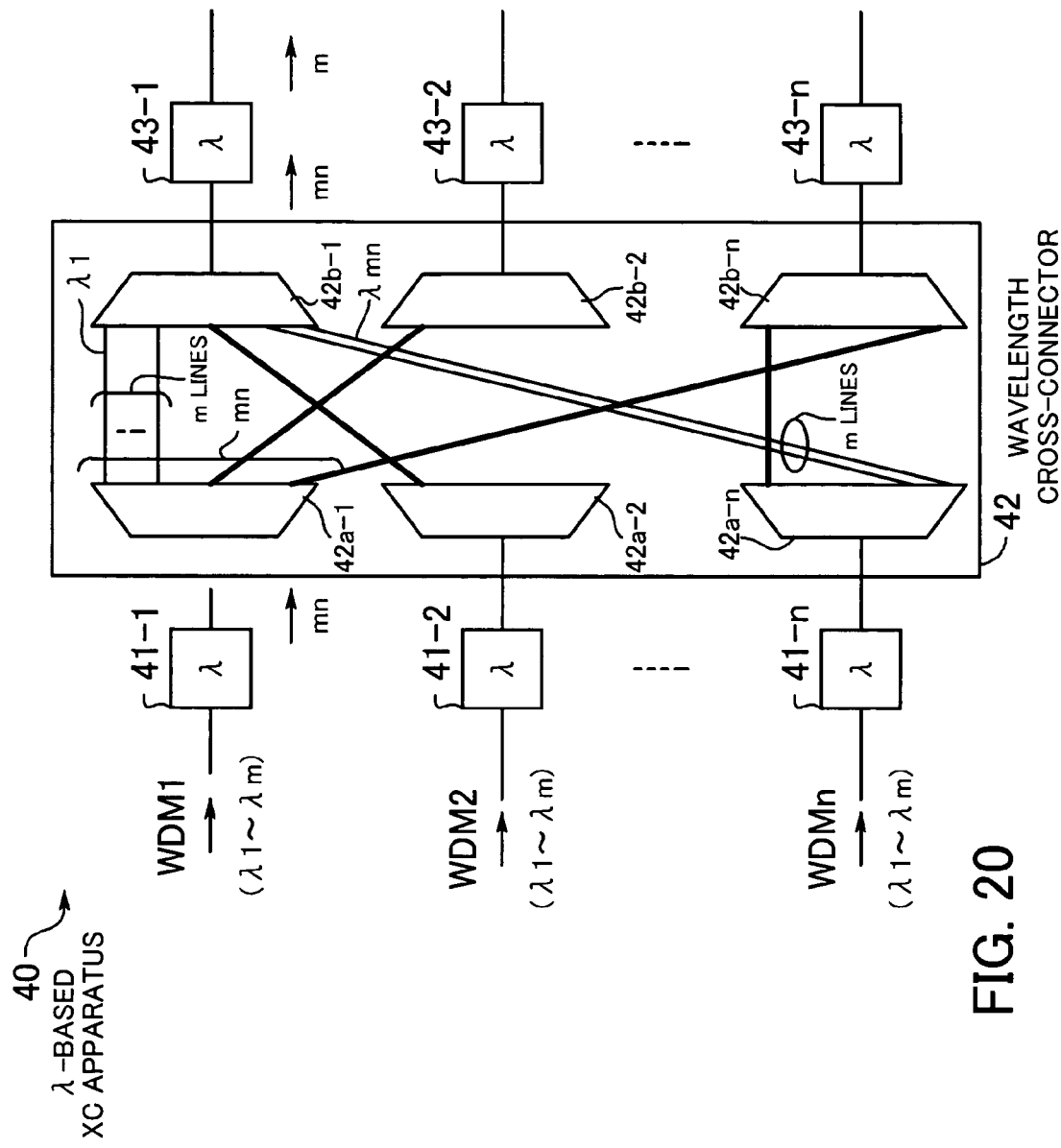
FIG. 20 shows the structure of a λ-based XC apparatus according to a fourth embodiment.

A λ-based XC apparatus according to a fourth embodiment of the present invention will now be described. FIG. 20 shows the structure of a A-based XC apparatus according to a fourth embodiment. The structure of the non-blocking type spatial switch SW10 shown in FIG. 8 is applied to a λ-based XC apparatus 40.

n input-side wavelength converters 41-1 through 41-n (hereinafter referred to as the wavelength converters 41-1 through 41-n) convert m different wavelengths λ1 through λm contained in input WDM signals into mn wavelengths λ1 through λmn.

A wavelength cross-connector 42 includes demultiplexers 42a-1 through 42a-n and multiplexers 42b-1 through 42b-n and performs cross-connection according to wavelengths.

The n demultiplexers 42a-1 through 42a-n separate the optical signals wavelength-converted by the wavelength converters 41-1 through 41-n into mn different wavelengths. The n multiplexers 42b-1 through 42b-n combine optical signals with the mn different wavelengths. The same wavelengths should not be sent via each of bundles of m lines by which the demultiplexers 42a-1 through 42a-n and the multiplexers 42b-1 through 42b-n are connected.

n output-side wavelength converters 43-1 through 43n convert the mn different wavelengths $\lambda 1$ through $\lambda mn$ contained in optical signals cross-connected by the wavelength cross-connector 42 into m wavelengths $\lambda 1$ through $\lambda m$ and send them.

Figure 21:
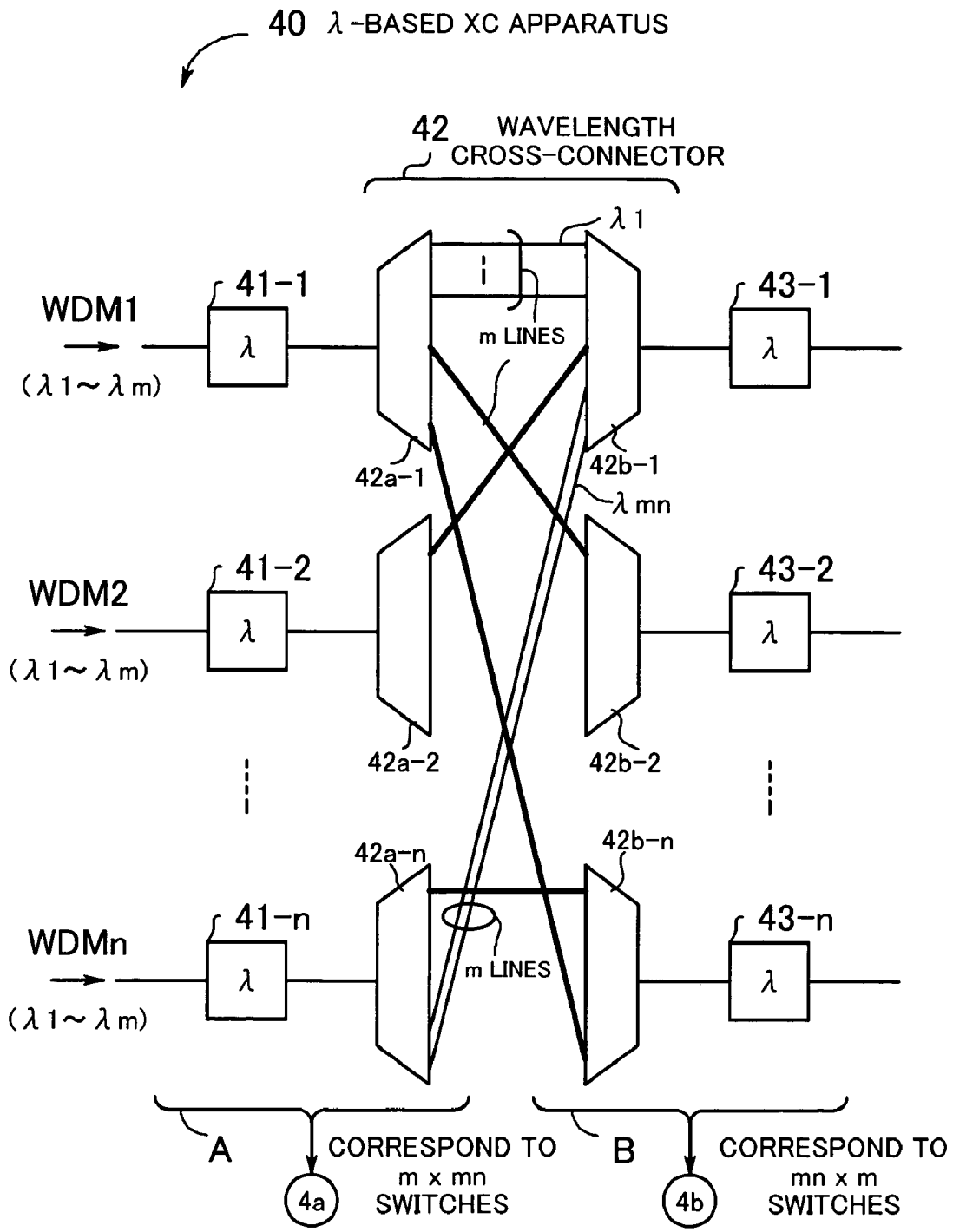
FIG. 21 shows the correspondence. between a λ-based XC apparatus and a spatial switch.
Figure 22:
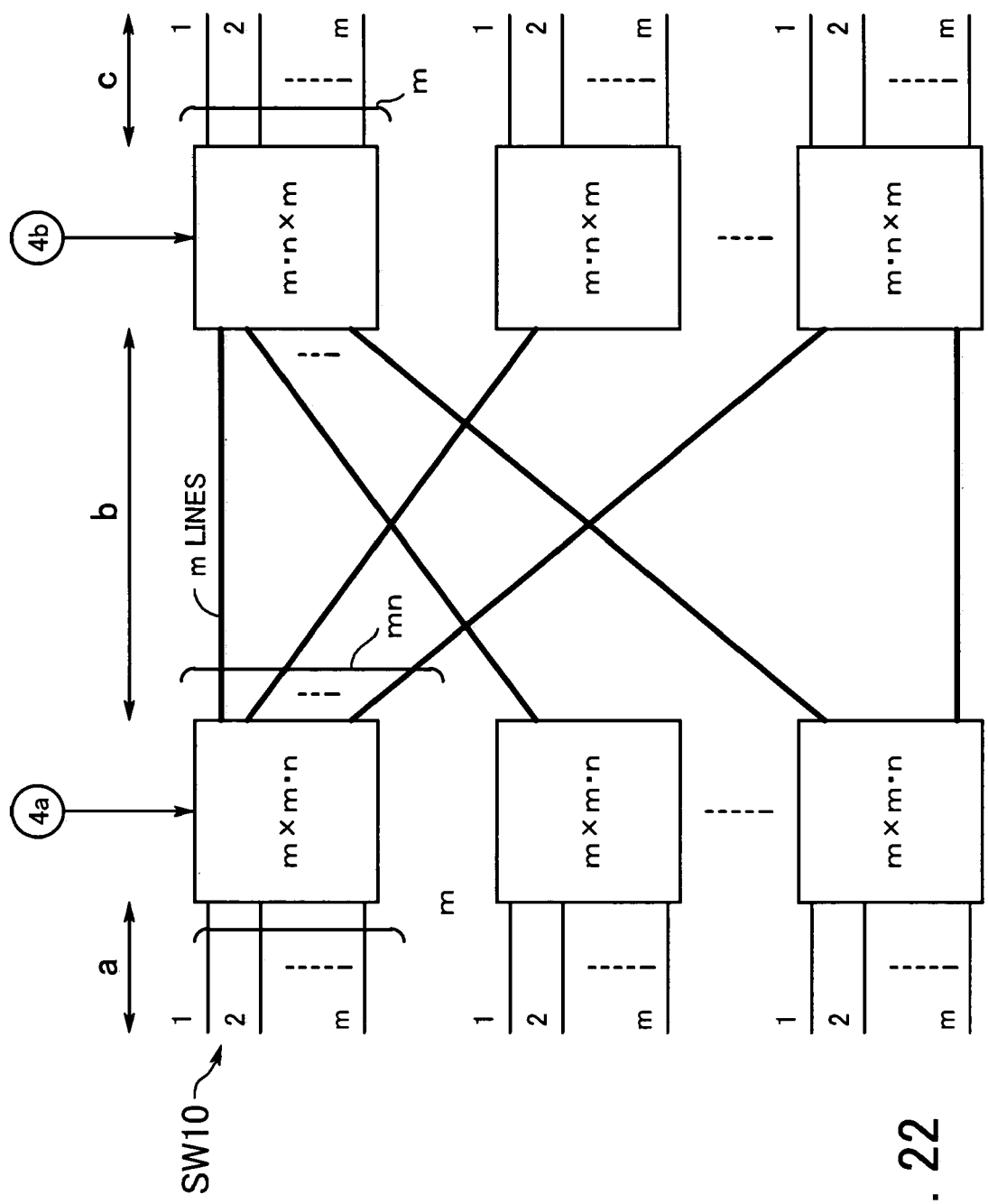
FIG. 22 shows the correspondence between a λ-based XC apparatus and a spatial switch.

The correspondence between the $\lambda$-based XC apparatus 40 and the spatial switch SW10 will now be described. FIGS. 21 and 22 show the correspondence between the $\lambda$-based XC apparatus 40 and the spatial switch SW10. An area $\lambda$ in the $\lambda$-based XC apparatus 40 from the input side of the wavelength converter 41 to the output side of the demultiplexer 42a in the wavelength cross-connector 42 corresponds to the m×mn switches at the first stage in the spatial switch SW10.

An area B from the input side of the multiplexer 42b in the wavelength cross-connector 42 to the output side of the wavelength converter 43 corresponds to the mn×n switches at the second stage in the spatial switch SW10.

One physical input line WDM is connected to each wavelength converter 41 in the $\lambda$-based XC apparatus 40, but the m wavelengths $\lambda 1$ through $\lambda m$ are sent via it. Accordingly, by taking the number of wavelengths sent into consideration, one physical input line can be considered m signal input lines. This number is equal to that of the incoming lines of each m×mn switch in an area a in the spatial switch SW10.

The output fibers of each of the n demultiplexer 42a are bundled by m's and are connected to the n multiplexer 42b, respectively. This is the same as the correspondence in an area b in the spatial switch SW10 between the outgoing lines of the m×mn switches and the incoming lines of the mn×m switches.

One physical output line WDM is connected to each wavelength converter 43 in the $\lambda$-based XC apparatus 40, but the m wavelengths $\lambda 1$ through $\lambda m$ are sent via it. Accordingly, by taking the number of wavelengths sent into consideration, one physical output line can be considered m signal output lines. This number is equal to that of the outgoing lines of each mn×m switch in an area c in the spatial switch SW10. That is to say, the $\lambda$-based XC apparatus 40 is equal to the spatial switch SW10 in structure and therefore is a non-blocking type switch.

Figure 23:
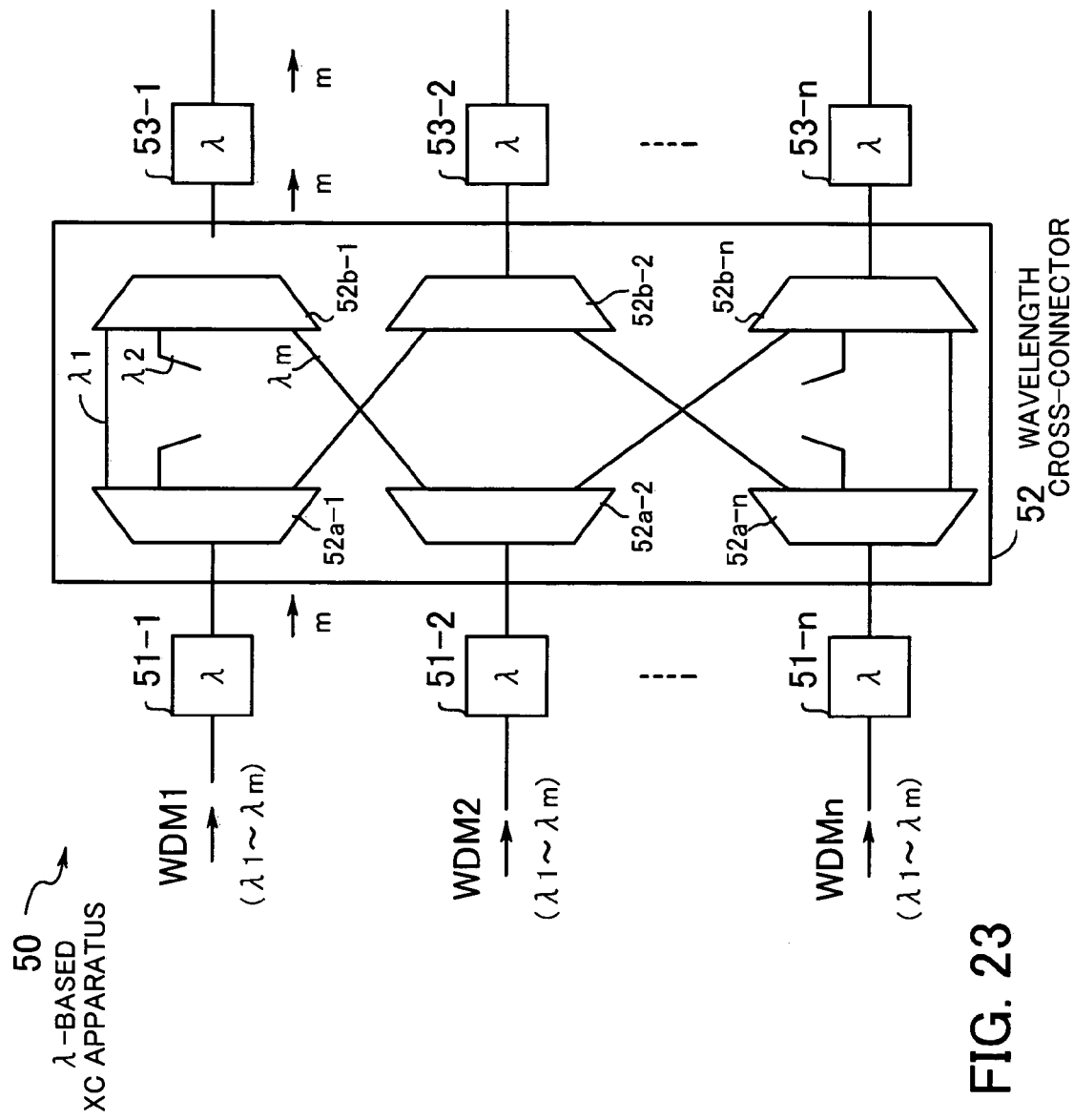
FIG. 23 shows the structure of a λ-based XC apparatus according to a fifth embodiment.

A $\lambda$-based XC apparatus according to a fifth embodiment of the present invention will now be described. FIG. 23 shows the structure of a $\lambda$-based XC apparatus according to a fifth embodiment. All of the above $\lambda$-based XC apparatus according to the first through fourth embodiments are switches of a complete non-blocking type, but a $\lambda$-based XC apparatus 50 according to the fifth embodiment is a switch of a blocking type in which congestion may occur. Compared with conventional OXC apparatus, however, the $\lambda$-based XC apparatus 50 can realize large-scale switching and high throughput. Therefore, the $\lambda$-based XC apparatus 50 will be useful if the number of channels can be limited to a certain extent.

n wavelength converters (input-side wavelength converters) 51-1 through 51-n convert m different wavelengths $\lambda 1$ through $\lambda m$ contained in input WDM signals into m wavelengths.

A wavelength cross-connector 52 includes n demultiplexers 52a-1 through 52a-n for separating the signals into m different wavelengths and n multiplexers 52b-1 through 52b-n for combining optical signals with the m different wavelengths and performs cross-connection according to wavelengths.

n wavelength converters (output-side wavelength converters) 53-1 through 53-n convert the m different wavelengths contained in the optical signals cross-connected by the wavelength cross-connector 52 into m wavelengths $\lambda 1$ through $\lambda m$ and send them.

The scale of the $\lambda$-based XC apparatus according to the first through fifth embodiments will now be described. FIGS. 24 and 25 show the scale of the $\lambda$-based XC apparatus. A table T1 shows the number of the multiplexers/demultiplexers (AWGs) used in the wavelength cross-connectors and wavelength converters in the $\lambda$-based XC apparatus 10, 20, 30, 40, and 50. A table T2 shows the number of the wavelength converters in the $\lambda$-based XC apparatus 10, 20, 30, 40, and 50.

Hereinafter an AWG (demultiplexer) having M demultiplexing output lines or an AWG (multiplexer) having M multiplexing input lines will be referred to as an M$\lambda$ AWG. For example, an AWG which separates m different wavelengths contained in an optical signal and which launches them into m different demultiplexing output lines is an m$\lambda$ AWG. In addition, an AWG which receives m optical signals with different wavelengths via m different multiplexing input lines and which combines them is an m$\lambda$ AWG.

The scale of the $\lambda$-based XC apparatus 10 shown in FIG. 1 is as follows. The wavelength cross-connector 12 includes n 2m$\lambda$ AWGs 12a-1 through 12a-n and n 2m$\lambda$ AWGs 12b-1 through 12b-n. The wavelength cross-connector 14 includes n 2m$\lambda$ AWGs 14a-1 through 14a-n and n 2m$\lambda$ AWGs 14b-1 through 14b-n. Therefore, a total of 4n 2m$\lambda$ AWGs are included in these wavelength cross-connectors.

The wavelength converters 11-1 through 11-n include n m$\lambda$ AWGs on the demultiplexer side and n 2m$\lambda$ AWGs on the multiplexer side. The wavelength converters 15-1 through 15-n include n 2m$\lambda$ AWGs on the demultiplexer side and n m$\lambda$ AWGs on the multiplexer side.

The wavelength converters 13-1 through 13-n include n 2m$\lambda$ AWGs on the demultiplexer side and n 2m$\lambda$ AWGs on the multiplexer side. Therefore, a total of 2n m$\lambda$ AWGs and 4n 2m$\lambda$ AWGs are included in these wavelength converters.

The number of the wavelength converters 11-1 through 11-n and 15-1 through 15-n which convert m different wavelengths into 2m different wavelengths or 2m different wavelengths into m different wavelengths is 2n. The number of the wavelength converters 13-1 through 13-n which convert 2m different wavelengths into 2m different wavelengths is n.

The scale of the $\lambda$-based XC apparatus 20 shown in FIG. 14 is as follows. The wavelength cross-connector 22 includes n 2m$\lambda$ AWGs 22a-1 through 22a-n and 2n m$\lambda$ AWGs 22b-1 through 22b-2n. The wavelength cross-connector 24 includes 2n m$\lambda$ AWGs 24a-1 through 24a-2n and n 2m$\lambda$ AWGs 24b-1 through 24b-n. Therefore, a total of 2n 2m$\lambda$ AWGs and 4n m$\lambda$ AWGs are included in these wavelength crossconnectors.

The wavelength converters 21-1 through 21-n include n m$\lambda$ AWGs on the demultiplexer side and n 2m$\lambda$ AWGs on the multiplexer side. The wavelength converters 25-1 through 25-n include n 2m$\lambda$ AWGs on the demultiplexer side and n m$\lambda$ AWGs on the multiplexer side. The wavelength converters 23-1 through 23-2n include 2n m$\lambda$ AWGs on the demultiplexer side and 2n m$\lambda$ AWGs on the multiplexer side. Therefore, a total of 6n mλ AWGs and 2n 2mλ AWGs are included in these wavelength converters.

The number of the wavelength converters 21-1 through 21-n and 25-1 through 25-n which convert m different wavelengths into 2m different wavelengths or 2m different wavelengths into m different wavelengths is 2n. The number of the wavelength converters 23-1 through 23-2n which convert m different wavelengths into m different wavelengths is 2n. Compared with the λ-based XC apparatus 10 shown in FIG. 1, the number of large-scale 2mλ AWGs can be reduced in the λ-based XC apparatus 20 shown in FIG. 14.

The scale of the λ-based XC apparatus 30 shown in FIG. 17 is as follows. The wavelength cross-connector 32 includes n (2m−1) λ AWGs 32a-1 through 32a-n and (2m−1) nλ AWGs 32b-1 through 32b-(2m−1). The wavelength cross-connector 34 includes (2m−1) λ AWGs 34a-1 through 34a-(2m−1) and n (2m−1) λ AWGs 34b-1 through 34b-n. Therefore, a total of 2n (2m−1) λ AWGs and 2(2m−1) nλ AWGs are included in these wavelength cross-connectors.

The wavelength converters 31-1 through 31-n include n mλ AWGs on the demultiplexer side and n (2m−1) λ AWGs on the multiplexer side. The wavelength converters 35-1 through 35-n include n (2m−1) λ AWGs on the demultiplexer side and n mλ AWGs on the multiplexer side. The wavelength converters 33-1 through 33-(2m−1) include (2m−1) nλ AWGs on the demultiplexer side and (2m−1) nλ AWGs on the multiplexer side. Therefore, a total of 2n mλ AWGs, 2n (2m−1) λ AWGs, and 2(2m−1) nλ AWGs are included in these wavelength converters.

The number of the wavelength converters 31-1 through 31-n and 35-1 through 35-n which convert m different wavelengths into (2m−1) different wavelengths or (2m−1) different wavelengths into m different wavelengths is 2n. The number of the wavelength converters 33-1 through 33(2m−1) which convert n different wavelengths into n different wavelengths is 2m−1.

No 2mλ AWG is used in the λ-based XC apparatus 30 shown in FIG. 17. Therefore, compared with the λ-based XC apparatus 10 shown in FIG. 1 and the λ-based XC apparatus 20 shown in FIG. 14, the λ-based XC apparatus 30 includes a small number of large-scale AWGs, but it includes a large number of elements.

The scale of the λ-based XC apparatus 40 shown in FIG. 20 is as follows. The wavelength cross-connector 42 includes n mnλ AWGs 42a-1 through 42a-n and n mnλ AWGs 42b-1 through 42b-n. Therefore, a total of 2n mnλ AWGs are included in the wavelength cross-connector.

The wavelength converters 41-1 through 41-n include n mλ AWGs on the demultiplexer side and n mnλ AWGs on the multiplexer side. The wavelength converters 43-1 through 43-n include n mnλ AWGs on the demultiplexer side and n mλ AWGs on the multiplexer side. Therefore, a total of 2n mλ AWGs and 2n mnλ AWGs are included in these wavelength converters.

The number of the wavelength converters 41-1 through 41-n and 43-1 through 43-n which convert m different wavelengths into mn different wavelengths or mn different wavelengths into m different wavelengths is 2n. If a large-scale mnλ AWG can be realized, the structure of the λ-based XC apparatus 40 shown in FIG. 20 will be the simplest.

The scale of the λ-based XC apparatus 50 shown in FIG. 23 is as follows. The wavelength cross-connector 52 includes n mλ AWGs 52a-1 through 52a-n and n mλ AWGs 52b-1 through 52b-n. Therefore, a total of 2n mλ AWGs are included in the wavelength cross-connector.

The wavelength converters 51-1 through 51-n include n mλ AWGs on the demultiplexer side and n mλ AWGs on the multiplexer side. The wavelength converters 53-1 through 53-n include n mλ AWGs on the demultiplexer side and n mλ AWGs on the multiplexer side. Therefore, a total of 4n mλ AWGs are included in these wavelength converters.

The number of the wavelength converters 51-1 through 51-n and 53-1 through 53-n which convert m different wavelengths into m different wavelengths is 2n. The λ-based XC apparatus 50 shown in FIG. 23 is of a blocking type, so environment or specifications to which it is applied must be selected.

As described above, with the λ-based XC apparatus according to the present invention optical paths are switched according to wavelengths. Therefore, unlike conventional OXCs, spatial switches are unnecessary. As a result, highly efficient optical cross-connection can be realized by performing large-scale switching. The most suitable apparatus can be selected from among the embodiments of the present invention with the scale of multiplexers and demultiplexer, costs, etc. taken into consideration.

As has been described in the foregoing, the optical cross-connect apparatus according to the present invention comprises the first wavelength converters for converting m different wavelengths $\lambda 1$ through $\lambda m$ contained in n WDM input optical signals into 2m wavelengths $\lambda 1$ through $\lambda 2m$; the first wavelength cross-connector for performing cross-connection according to wavelengths, including the demultiplexers for separating the optical signals wavelength-converted by the first wavelength converters into 2m wavelengths and the multiplexers for combining optical signals with the 2m separated wavelengths, wherein the same wavelengths should not be sent via each of bundles of 2m/n lines by which the demultiplexers and the multiplexers are connected; the second wavelength converters for converting the 2m wavelengths contained in the optical signals cross-connected by the first wavelength cross-connector into 2m wavelengths; the second wavelength cross-connector for performing cross-connection according to wavelengths, including the demultiplexers for separating the optical signals wavelength-converted by the second wavelength converters into 2m wavelengths and the multiplexers for combining optical signals with the 2m separated wavelengths, wherein the same wavelengths should not be sent via each of bundles of 2m/n lines by which the demultiplexers and the multiplexers are connected; and the third wavelength converters for converting the 2m wavelengths $\lambda 1$ through $\lambda 2m$ contained in the optical signals cross-connected by the second wavelength cross-connector into m wavelengths $\lambda 1$ through $\lambda m$ and for sending them. As a result, highly efficient optical cross-connection can be realized by performing large-scale switching.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical cross-connect apparatus for performing non-blocking optical cross-connection of n WDM input optical signals each containing m different wavelengths $\lambda 1$ through $\lambda m$, the apparatus comprising:

n first wavelength converters for converting the m different wavelengths λ1 through λm contained in the WDM input optical signals into 2m wavelengths λ1 through λ2m;

a first wavelength cross-connector for performing cross-connection according to wavelengths, the cross-connector including:
  n first demultiplexers for separating the optical signals wavelength-converted by the first wavelength converters into 2m wavelengths, and
  n first multiplexers for combining optical signals with the 2m separated wavelengths,
  wherein same wavelengths should not be sent via each of bundles of 2m/n lines by which the first demultiplexers and the first multiplexers are connected;

n second wavelength converters for converting the 2m wavelengths contained in the optical signals cross-connected by the first wavelength cross-connector into 2m wavelengths;

a second wavelength cross-connector for performing cross-connection according to wavelengths, the cross-connector including:
  n second demultiplexers for separating the optical signals wavelength-converted by the second wavelength converters into 2m wavelengths, and
  n second multiplexers for combining optical signals with the 2m separated wavelengths,
  wherein same wavelengths should not be sent via each of bundles of 2m/n lines by which the second demultiplexers and the second multiplexers are connected; and n third wavelength converters for converting the 2m wavelengths λ1 through λ2m contained in the optical signals cross-connected by the second wavelength cross-connector into m wavelengths λ1 through λm and for sending the m wavelengths λ1 through λm.

2. An optical cross-connect apparatus for performing non-blocking optical cross-connection of n WDM input optical signals each containing m different wavelengths λ1 through λm, the apparatus comprising:

n first wavelength converters for converting the m different wavelengths λ1 through λm contained in the WDM input optical signals into 2m wavelengths λ1 through λ2m;

a first wavelength cross-connector for performing cross-connection according to wavelengths, the cross-connector including:
  n first demultiplexers for separating the optical signals wavelength-converted by the first wavelength converters into 2m wavelengths, and
  2n first multiplexers for combining optical signals with m separated wavelengths,
  wherein same wavelengths should not be sent via each of bundles of m/n lines by which the first demultiplexers and the first multiplexers are connected;

2n second wavelength converters for converting the m wavelengths contained in the optical signals cross-connected by the first wavelength cross-connector into m wavelengths;

a second wavelength cross-connector for performing cross-connection according to wavelengths, the cross-connector including:
  2n second demultiplexers for separating the optical signals wavelength-converted by the second wavelength converters into m wavelengths, and
  n second multiplexers for combining optical signals with the 2m separated wavelengths,
  wherein same wavelengths should not be sent via each of bundles of m/n lines by which the second demultiplexers and the second multiplexers are connected; and n third wavelength converters for converting the 2m wavelengths λ1 through λ2m contained in the optical signals cross-connected by the second wavelength cross-connector into m wavelengths λ1 through λm and for sending the m wavelengths λ1 through λm.

3. An optical cross-connect apparatus for performing non-blocking optical cross-connection of n WDM input optical signals each containing m different wavelengths λ1 through λm, the apparatus comprising:

n first wavelength converters for converting the m different wavelengths λ1 through λm contained in the WDM input optical signals into (2m−1) wavelengths λ1 through λ2m−1;

a first wavelength cross-connector for performing cross-connection according to wavelengths, the cross-connector including:
  n first demultiplexers for separating the optical signals wavelength-converted by the first wavelength converters into (2m−1) wavelengths, and
  (2m−1) first multiplexers for combining optical signals with n separated wavelengths,
  wherein each of the first demultiplexers is connected to each of the first multiplexers by one line;

(2m−1) second wavelength converters for converting the n wavelengths contained in the optical signals cross-connected by the first wavelength cross-connector into n wavelengths;

a second wavelength cross-connector for performing cross-connection according to wavelengths, the cross-connector including:
  (2m−1) second demultiplexers for separating the optical signals wavelength-converted by the second wavelength converters into n wavelengths, and
  n second multiplexers for combining optical signals with (2m−1) separated wavelengths,
  wherein each of the second demultiplexers is connected to each of the second multiplexers by one line; and n third wavelength converters for converting the (2m−1) wavelengths λ1 through λ2m−1 contained in the optical signals cross-connected by the second wavelength cross-connector into m wavelengths λ1 through λm and for sending the m wavelengths λ1 through λm.

4. An optical cross-connect apparatus for performing non-blocking optical cross-connection of n WDM input optical signals each containing m different wavelengths λ1 through λm, the apparatus comprising:

n input-side wavelength converters for converting the m different wavelengths λ1 through λm contained in the WDM input optical signals into mn wavelengths λ1 through λmn;

a wavelength cross-connector for performing cross-connection according to wavelengths, the cross-connector including:
  n demultiplexers for separating the optical signals wavelength-converted by the input-side wavelength converters into mn wavelengths, and
  n multiplexers for combining optical signals with the mn separated wavelengths,
  wherein same wavelengths should not be sent via each of bundles of m lines by which the demultiplexers and the multiplexers are connected; and n output-side wavelength converters for converting the mn wavelengths λ1 through λmn contained in the optical signals cross-connected by the wavelength cross-connector into m wavelengths λ1 through λm and for sending the m wavelengths λ1 through λm.

5. An optical cross-connect apparatus for performing optical cross-connection of n WDM input optical signals each containing m different wavelengths λ1 through λm, the apparatus comprising:

n input-side wavelength converters for converting the m different wavelengths λ1 through λm contained in the WDM input optical signals into m wavelengths;

a wavelength cross-connector for performing cross-connection according to wavelengths, the cross-connector including:

n demultiplexers for separating the optical signals wavelength-converted by the input-side wavelength converters into m wavelengths, and n multiplexers for combining optical signals with the m separated wavelengths; and n output-side wavelength converters for converting the m wavelengths contained in the optical signals cross-connected by the wavelength cross-connector into m wavelengths λ1 through λm and for sending the m wavelengths λ1 through λm.

* * * * *